United States Patent [19]

Heffner

[11] 3,800,280

[45] Mar. 26, 1974

[54] TIME SKEW MEASUREMENT CIRCUIT FOR MAG TAPE TRANSPORTS

[75] Inventor: Samuel T. Heffner, Villa Park, Ill.

[73] Assignee: GTE Automatic Electric Laboratories Incorporated, Northlake, Ill.

[22] Filed: Nov. 6, 1972

[21] Appl. No.: 304,280

[52] U.S. Cl. .................... 340/146.1 F, 340/174.1 B

[51] Int. Cl. ............................................ G06k 5/04

[58] Field of Search.... 340/146.1 F, 172.5, 174.1 B; 179/100.2 B

[56] References Cited

UNITED STATES PATENTS

| | | | |
|---|---|---|---|
| 3,508,231 | 4/1970 | Levin | 340/146.1 F |
| 3,622,187 | 1/1972 | Proctor et al. | 340/174.1 B |
| 3,728,679 | 4/1973 | McIntosh | 340/174.1 B |

*Primary Examiner*—Charles E. Atkinson
*Attorney, Agent, or Firm*—Robert F. Van Epps

[57] ABSTRACT

A skew measurement circuit for determining the skew characteristics (i.e., the minimum, maximum and average skew) of a magnetic tape transport system is disclosed. The circuit includes an instantaneous skew counter for measuring the difference in arrival times at a tape head (i.e., instantaneous skew) between reference channel and test channel bits aligned in lateral registry across the tape to form informational bytes. An average skew counter comprising up/down decade counters is provided to total the instantaneous skew during a one million byte skew test so that the average skew may be determined by shifting the decimal point. The instantaneous skew is also coupled to a min/max comparison and storage arrangement where it is compared with previously stored minimum and maximum skew values, replacing the appropriate one in a storage register if it is found to be a new extreme. Because an atypical minimum or maximum may be stored due to conditions (e.g., tape binding, etc.) that are not characteristic of the transport system, a decrementing circuit is provided for decreasing the maximum stored value and increasing the minimum stored value at a predetermined rate. Accordingly, the legitimacy of the stored skew values may be insured by requiring that they be periodically refreshed.

26 Claims, 13 Drawing Figures

TIME SKEW MEASUREMENT CIRCUIT FOR MAG TAPE TRANSPORTS

BACKGROUND OF THE INVENTION

The present invention relates generally to skew measurement circuits and more particularly to a circuit for determining the maximum, minimum and average skew of a magnetic tape transport system.

Reference may be made to the following U.S. Pats.: Nos. 3,657,704; 3,653,009; 3,562,723; 3,544,979; 3,456,237; 3,451,049; 3,427,591; 3,414,816; 3,325,794; 3,287,714; 3,286,243; 3,206,737; 3,154,762; Re. 25,527.

Magnetic tape units are commonly employed in electronic computers and other data processing systems to store certain information on multi-channel magnetic tape. Customarily, each piece, or byte of information is encoded as a series of binary bits and stored in lateral registry across the tape. If a 9 bit code is utilized, for example, each bit comprising a single byte of information is stored in a different one of the nine parallel channels running longitudinally along the tape. Ideally, the bits representing a particular byte should be aligned on the tape such that the bits can be read simultaneously by moving the tape past several laterally aligned playback heads. Usually, however, there is a time differential between the arrival of two bits in the same character (byte) at their respective tape heads. This time differential is designated the interchannel time displacement error (ITDE) or, more commonly, skew. Skew may arise, for example, if the playback heads are misaligned so that they are not positioned exactly perpendicular to the tape path, or if the tape transport itself is misaligned.

The maximum skew in a tape trapsort and playback system limits the density with which information can be stored, or recorded on a magnetic tape. That is, when the information bytes are recorded in close proximity to one another, read-out errors due to skew increase because some bits then fall outside of the necessarily narrow time interval allotted for "reading" the bits forming a particular byte.

When skew is accurately measured, it is usually possible to minimize or correct it. Further, knowledge of the maximum, minimum and average skew characteristics of a tape transport system aids the designer in determining the density with which the bytes should be stored on the magnetic tape itself. This, however, requires an accurate measurement of representative maximum, minimum and average skews, or the designer may be relying on "one time only" data which is atypical, thereby needlessly limiting his design parameters.

SUMMARY OF THE INVENTION

The skew measurement system of the present invention contemplates the utilization of instantaneous counting means for measuring the time differential, or skew, between the arrival of a particular reference information bit at a tape head and the arrival of its corresponding test bit. In addition, averaging means are provided to total the instantaneous skews over an entire skew test so that the average time differential (skew) may be determined. The instantaneous skew is also coupled to minimum and maximum comparison and storage means where the minimum and maximum values of skew formed up to that point in the skew test are stored. Further, the minimum and maximum comparison and storage means compares each subsequent instantaneous skew that is measured with the stored minimum and maximum values, replacing the appropriate one when a new minimum or maximum is detected. Also included are means for decrementing the stored minimum skew value "up" and the maximum skew value "down" at a predetermined rate so that they must be periodically refreshed to insure their accuracy as a characteristic of the tape transport system. One highly desirable feature of the present invention is that the average skew may be determined without including complex logic circuitry for performing actual division. Also, the maximum, minimum and average skew values are applied to digital read-outs for easier and more accurate interpretation of the data.

BRIEF DESCRIPTION OF THE DRAWINGS

The features of this invention which are believed to be novel are set forth with particularity in the appended claims. The invention together with its further objects and advantages thereof, may be best understood, however, by reference to the following description taken in conjunction with the accompanying drawings, in which like reference numerals identify like elements in the several figures and in which:

PREFERRED EMBODIMENT OF THE INVENTION

Figure 1:
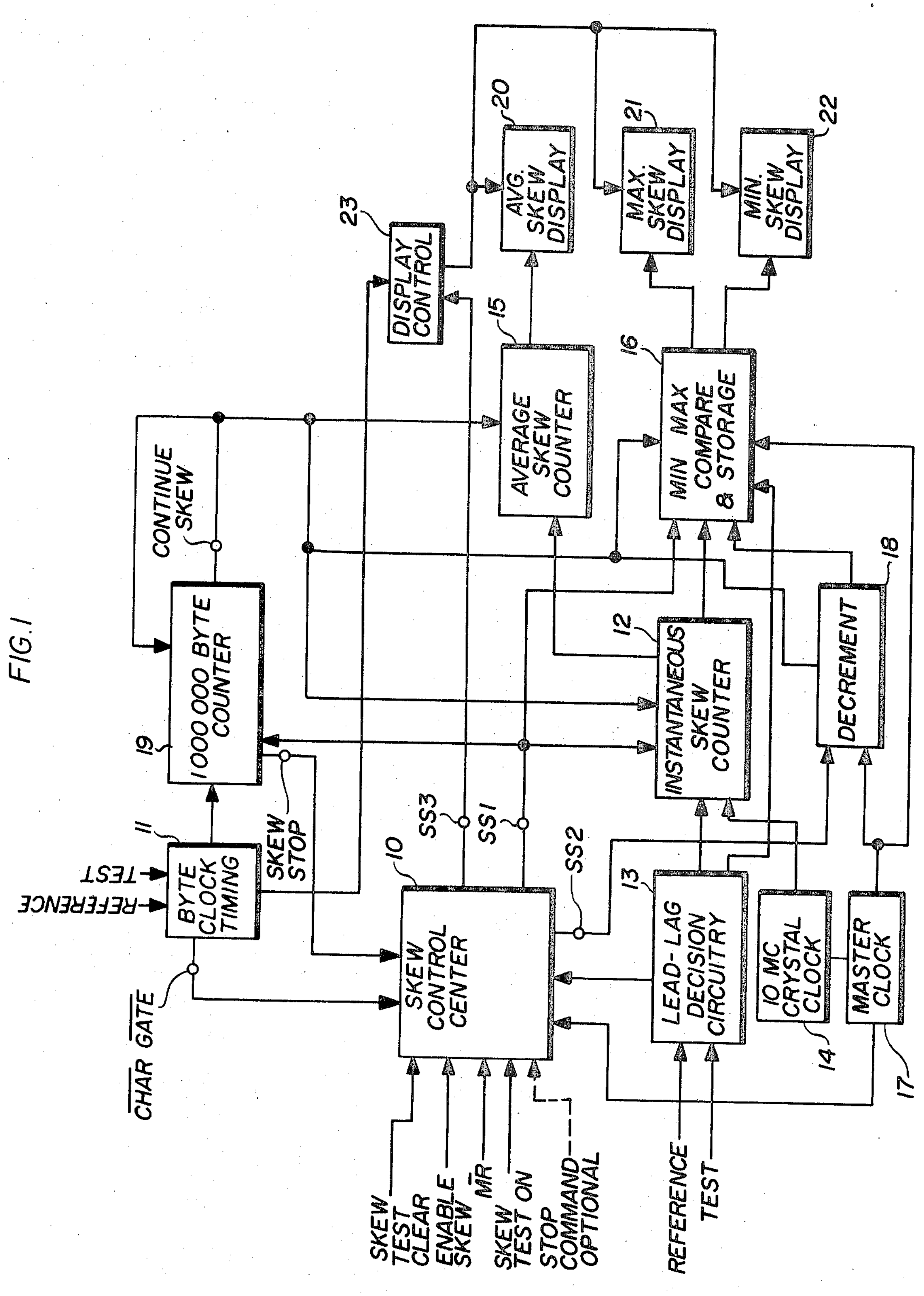
FIG. 1 is a block diagram of a skew measurement circuit in accordance with a preferred embodiment of the invention.

In order to complete a valid skew measurement test in accordance with the embodiment of the invention shown in FIG. 1, test tape having at least one million characters, or bytes, magnetically encoded thereon should be provided. Each byte, in turn, should comprise at least two binary information bits laterally disposed across the tape, one bit being found in a so-called reference channel and the other in a test channel. Further, each bit should be in its high (H), or 1, state to form an "all-one's" data pattern in both data channels. The skew of a number of test channels relative to the reference channel may be determined, however, by simply providing additional bits, corresponding to the additional test channels, laterally across the tape in the same time frame as the reference bit. Although the embodiment shown in FIG. 1 is easily expandable to measure the skew in eight test channels relative to a single reference channel, it will be assumed that a tape having only a reference channel and a test channel is being utilized thereby simplifying the description of the circuit's operation.

In FIG. 1, there is shown a skew control center 10 which generates internal control signals to set up the various conditions, or skew states, under which the other circuits in the skew measurement circuit perform their required functions. An ENABLE SKEW signal coupled to the corresponding input of skew control center 10 serves as an interface signal when the skew measurement circuit is connected to other equipment, such as computers. The SKEW TEST CLEAR signal, which is the complement of the SKEW TEST ON signal, resets the state counter (not shown) in skew control center 10 to its initial state upon completion of the skew test. A master reset (MR) signal may also be applied to the skew control center 10. A fifth input that is optionally provided is the STOP COMMAND signal which stops the skew test and enables a display of the test results before the test is actually completed.

To insure that the skew test will begin with a complete byte, each new test should be initiated concurrently with the first byte occurring subsequent to the enabling of the skew control center 10 by the ENABLE SKEW signal. Accordingly, the byte clock timing circuit 11 generates an internal character gate (CHAR GATE) signal that is coincident with each byte and applies it to the skew control center 10. More particularly, the character gate signal consists of a series of pulses, each pulse having its leading edge coincident with the "leading" bit in a byte, whether in the reference channel or in the test channel, and continuing for a predetermined time interval during which the skew measurement circuit will be allowed to search for the arrival of the "lagging" bit. The byte clock timing circuit 11 is itself responsive to the reference channel (REFERENCE) and test channel (TEST) input signals coupled from the tape heads (not shown) to its input terminals. That is, the tape heads "read" the all-one's bit pattern in the reference and test channels on the tape, which are converted by "read" amplifiers into a pair of pulse trains which are then coupled to the corresponding inputs of the byte clock timing circuit 11. The character gate signal is then initiated by the first pulse (i.e., bit) to arrive at either the reference or the test channel inputs. When the character gate "falls" after a predetermined time interval, the byte clock timing circuit 11 is then ready to generate the subsequent gating pulse upon receiving the first in the next byte.

When the ENABLE SKEW signal and a character gate not (CHAR GATE) pulse are applied to the skew control center 10, the state counter (not shown) in skew control center 10 switches from its "skew state zero" (SS0) condition to its "skew state one" (SS1) condition. The character gate not (CHAR GATE) pulse insures that the test will not start during a byte, but will only start when this byte is over so that complete bytes are tested. The SS1 control signal generated during the character gate not pulse is, in turn, applied to the instantaneous skew counter 12 where the particular byte is measured.

Besides being coupled to the byte clock timing clock timing circuit 11, the reference and test channel pulse trains developed by the tape head are applied to the REFERENCE and TEST inputs of the lead-lag decision circuitry 13. If the reference bit in any particular byte arrives before the corresponding test bit, a lag gate in the lead-lag circuitry 13 is enabled to provide a LAG pulse having a duration representative of the skew, or ITDE, between the reference and test bits. When this pulse is subsequently applied to the instantaneous skew counter 12 along with the 10 Mhz clock pulses from the 10 Mhz crystal clock 14, counting is initiated in the instantaneous skew counter 12. The counter 12 will then counter the 10 Mhz pulses (i.e., in 100 nanosecond intervals) until the lagging test bit is detected by the lead-lag circuitry 13 and the LAG pulse falls, disabling counter 12. Further, when the bit in the reference channel arrives before the test bit, the instantaneous skew is arbitrarily designated to be positive. If, on the other hand, the test bit arrives first, a lead gate is enabled to provide a LEAD pulse until the reference bit arrives. Once again, counting of the 10 Mhz pulses is initiated in the instantaneous skew counter 12 until the reference bit arrives and the LEAD pulse drops; but in this case, the instantaneous skew is designated as negative. Thus, regardless of which bit arrives first, the instantaneous counter 12 counts from the arrival of the first bit until the other bit arrives with the sign depending on which channel, reference or test, arrives first.

An average skew counter 15 is coupled to the instantaneous skew counter 12 for determining the average skew during the skew test. More particularly, the average counter 15 derives 1 microsecond clock pulses from the instantaneous counter 12, and in a similar manner, counts the pulses as long as the LEAD or LAG pulse is applied to the instantaneous counter 12. Unlike, the instantaneous counter 12, however, the average skew counter 15 is not reset for every byte, but rather, takes a running total of the instantaneous skews measured by the instantaneous counter 15 during the entire one million byte test sample. If the sign of the instantaneous skew and the sign of the average skew already counted by counter 15 are the same, the average counter 15 will count "up," adding the value of the instantaneous skew to its previous value. If the signs of the two counters are different, however, the average counter 15 will count "down," essentially subtracting the instantaneous value from the previous total in average counter 15. Because both the instantaneous counter 12 and the average counter 15 utilize synchronous binary-coded-decimal (BCD) up/down decade counters, the average skew for a one million byte test run can easily be determined by shifting the decimal point six places when the total skew in the average counter 15 is displayed. The insignificant digits to the right of the decimal point may be ignored, displaying only the first three significant numbers. If a test sample of other than $10^n$ (e.g., one million bits) and/or binary counters were used, actual division would have to be performed instead of simulated division thereby greatly increasing the complexity of the averaging operation.

The instantaneous skew measured by the instantaneous skew counter 12 is simultaneously coupled to a min/max compare and storage circuit 16 where, responsive to the SS1 control signal from skew control center 10, it is compared with the maximum and minimum values of instantaneous skew stored therein. If the instantaneous skew exceeds that stored in the maximum skew storage counter (not shown) or is less than that stored in the minimum skew storage counter (not shown), the instantaneous skew will be loaded into the appropriate storage counter, replacing the old maximum or minimum. Of course, the instantaneous skew of the first byte in the skew test is loaded into both the minimum and maximum storage counters and compared thereafter with the instantaneous skews of subsequent bytes. The min/max circuit 16 is enabled to compare the instantaneous skew with the stored values only when a control signal from lead/lag decision circuitry 13 indicates that both the reference and test bits have been detected (i.e., the instantaneous skew measurement is complete). The min/max circuit 16 also receives clock pulses from a master clock 17 which is, in turn, driven by the 10 MHz crystal clock 14 so that its comparison operation occurs in the proper time sequence with operations performed by other circuits. Accordingly, the instantaneous skew may then be compared with the stored maximum and minimum values and stored in the appropriate storage counter if it is found to be a new maximum or minimum.

Occasionally, however, the min/max compare and storage circuit 16 may detect a maximum or minimum skew that is likely to appear only once during a complete one million byte skew test due to a unique situation. That is, it is not uncommon that a residue or dirt will collect on the tape or tape guide and cause the tape to bind in the transport. When this happens, an unusually high maximum or low minimum skew which is not characteristic of the tape transport system may be expected. Accordingly, rather than maintaining this unusual one-time-only instantaneous skew in the minimum or maximum storage counters and thereby giving a false impression of the range over which the skew may vary, a decrement circuit 18 is included to count the maximum value "down" and the minimum value "up" at a predetermined rate. In this way, inaccurate readings are factored out by requiring that the storage counters be periodically "refreshed" to show that an extreme maximum or minimum value is, indeed, valid. Because the skew test runs for one million bytes, however, an uncharacteristic maximum or minimum will not distort the average skew to any great extent, and accordingly, the average skew counter 15 is not decremented. The decrement circuit 18, responsive to the SS2 control signal from skew control center 10 decrements the maximum and minimum values at a predetermined rate. A clock signal (MC) is applied to the decrement circuit 18 from master clock 17 which is, in turn, driven by the 10 MHz crystal clock 14, dividing the 10 MHz pulse train by a factor of four. The MC signal is utilized to generate a decrement pulse of 1 clock period length at a rate determined by a UJT relaxation oscillator. Although in the present embodiment the decrementing rate is fixed, provision may be made to variably adjust the rate to that which the user considers legitimate.

The character gate (CHAR GATE) pulses from byte clock timing circuit 11 are also applied to the one million byte counter 19 where, responsive to the SS1 control signal from skew control center 10, each gating pulse is counted. As long as counter 19 has not counted one million bytes, it will generate a CONTINUE SKEW signal, indicating that the skew test has not been completed. The CONTINUE SKEW signal is applied in feedback manner to counter 19, permitting it to continue the counting operation. The CONTINUE SKEW signal is also coupled to instantaneous skew counter 12, the average skew counter 16, the min/max compare and storage circuit 16 and the decrement circuit 18 so that they continue their normal skew test operations. When counter 19 has counted one million bytes, however, it generates a SKEW STOP signal which is applied to the skew control center 10, switching it from the skew state two (SS2) condition to the skew state three (SS3) condition.

After the one million byte skew test has been completed, the average skew value determined during skew state one is coupled from the average counter 15 to the average skew display 20. Likewise, the maximum and minimum skew values from min/max compare and storage circuit 16 are coupled to a maximum skew display 21 and a minimum skew display 22, respectively. The displays 20, 21, 22 are each three and one-half digit LED displays, with the 1/2 digit being used to indicate whether the value is positive or negative or, alternatively, whether the skew measured has exceeded the counters capacity. After skew state two has been completed, the skew control center 10 applies the SS3 control signal to the display control 23 which, in turn, multiplexes the displays 20, 21 and 22 at a 1.0 khz on frequency, obtained by dividing the 4.0 khz clock pulses from the byte clock timing circuit 11. Accordingly, when display control 23 is activated by the SS3 control signal at the end of the skew test, the test results, in microseconds, are displayed on the respective displays. Once the skew test has been completed and the average, minimum and maximum skew values displayed, the various counters and circuits in the skew measurement system are cleared in preparation for a new test by applying a SKEW TEST CLEAR signal to skew control center 10.

During skew state one, two error conditions may be detected by the lead-lag decision circuitry 13. The first is "bit dropout" which occurs when the byte clock timing circuit 11 is triggered by the leading bit, whether reference or test, but the resultant character gate signal subsequently falls before the lagging bit in the other channel is detected. The second error condition, "bit overrun," occurs when two or more bits are detected on the same channel during one byte time (i.e., character gate pulse). In either event, the lead-lag circuitry 13 applies an appropriate signal to the skew control center 10 which is then switched to skew state four for bit dropout or skew state five for bit overrun, resetting the instantaneous counter 12 and activating indicator lights.

Figure 2:
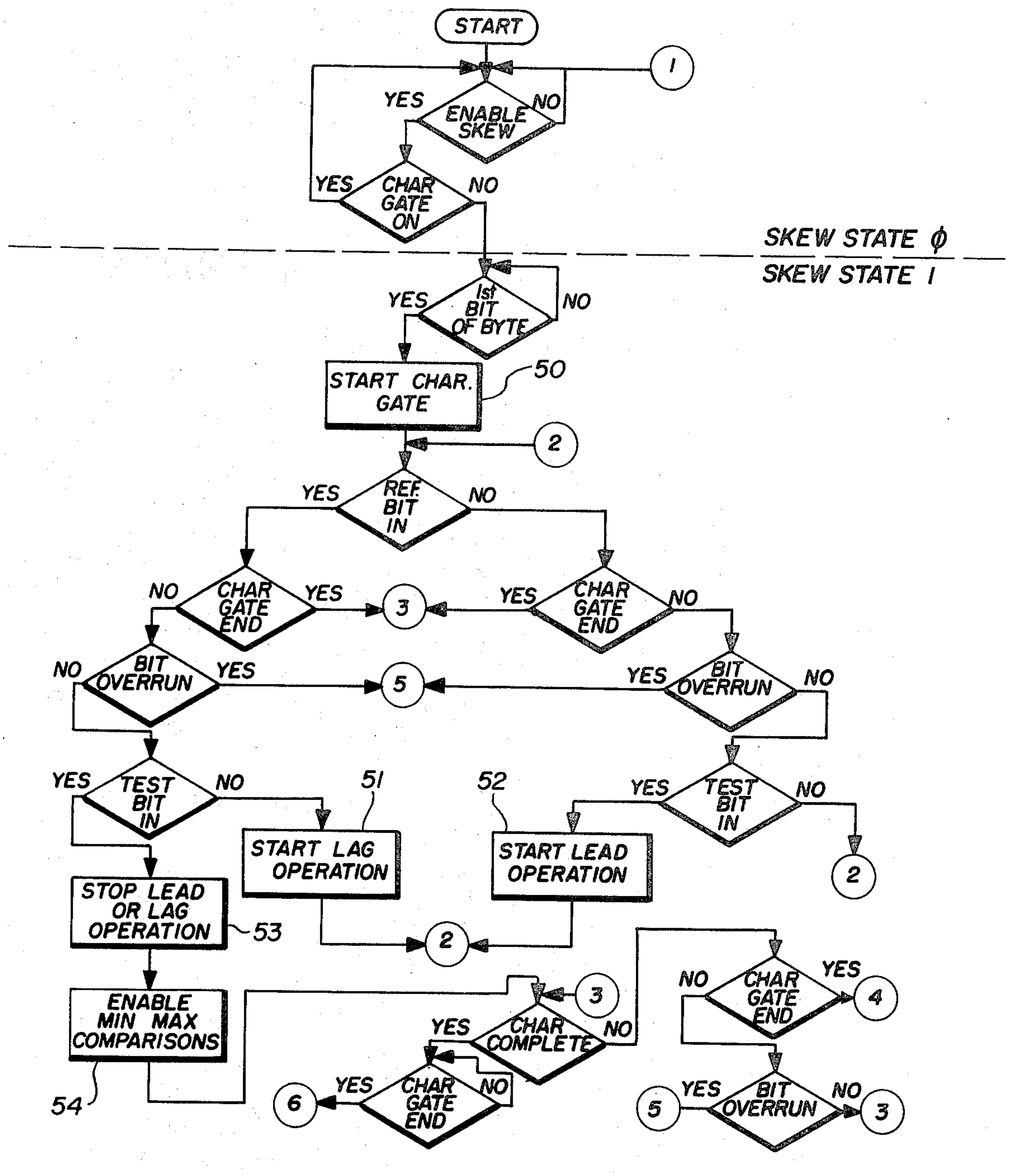
FIGS. 2 and 3 are information flow charts useful in understanding the operation of the skew measurement circuit.
Figure 3:
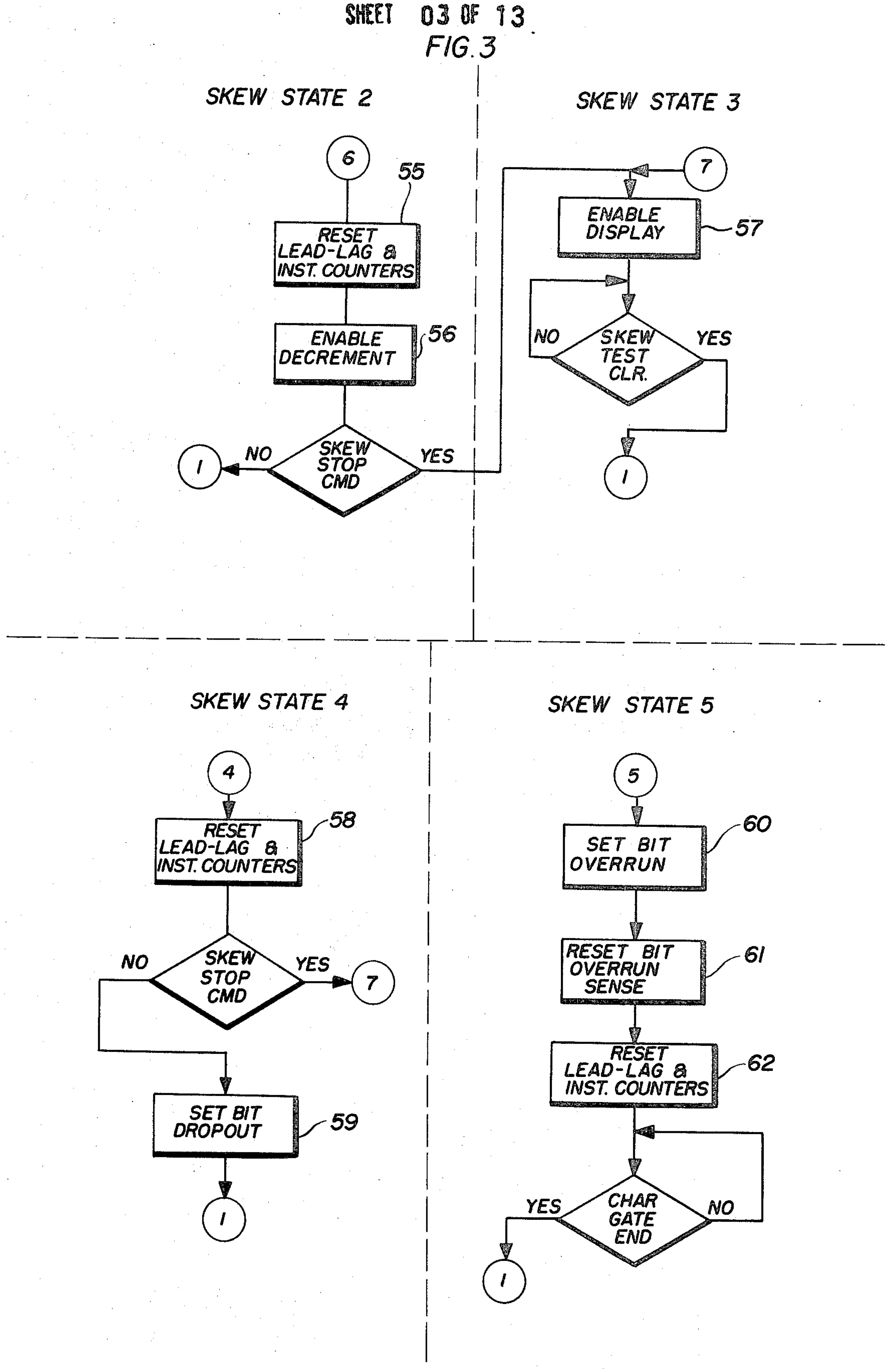

Reference now to the flow charts shown in FIGS. 2 and 3 may aid in further understanding the present invention. To initiate a skew test, the ENABLE SKEW signal is applied to the skew control center during Skew State $\phi$ (FIG. 2). Once enabled, the skew control center determines whether the character gate is ON; that is, whether the gating pulse coincident with byte of information is being generated. If the character gate is ON, indicating that a byte should be passing the tape heads, the skew control center is maintained in Skew State $\phi$ until the character gate pulse falls, or is no longer ON, so that the skew test begins with a complete byte rather than in the middle of the byte. Accordingly, the Skew State 1 (SS1) signal is generated to enable the taking of data.

When the first bit in the byte is detected by the byte clock timing circuit, the character gate (CHAR GATE) pulse is started (block 50). Once the first bit has been detected, the lead-lag decision circuitry determines if it is the reference or the test bit. If it is found that the reference bit is IN and the CHAR GATE pulse has not yet ended, the lead-lag circuitry checks for the BIT OVERRUN error condition, i.e., whether two or more bits have been detected in the reference channel during a single CHAR GATE pulse. When the BIT OVERRUN has not occurred, the skew test continues, and the lead-lag circuitry determines whether the corresponding test bit is IN. If it is not, the LAG OPERATION (block 51) is started (i.e., the instantaneous and average skew counters begin counting in the positive direction), and the system continues counting until the test track is IN.

On the other hand, if the reference bit is not the first one IN after the CHAR GATE has started (block 50), it is determined whether the CHAR GATE pulse has ended and if there is BIT OVERRUN. If neither condition is true, the LEAD OPERATION is started, i.e., counting in the negative direction, (block 52) when the test bit is detected and continues until the reference bit is IN.

After both the reference and test bit are IN, the LEAD OR LAG OPERATION is stopped (block 53) and the MIN/MAX COMPARISIONS are made (block 54) to determine whether the instantaneous skew represents a new minimum or maximum skew level. Once both the reference and test bits have been detected, the lead-lag circuitry generates a CHAR COMPLETE signal. Subsequently, the byte clock timing circuit generates the CHAR GATE END signal coincident with the conclusion of CHAR GATE pulse and applies it to the skew control center. Accordingly, the skew control center switches from Skew State 1 to Skew State 2 (at circle 6 in FIG. 3).

During Skew State 2, the lead-lag circuitry and the instantaneous skew counter are reset to their initial states (block 55). The decrement circuit is then enabled (block 56) to increase the minimum and decrease the maximum stored skew values at a predetermined rate. If the one million byte skew test has not been completed or stopped by the operator, the system will be returned to START (circle 1 in FIG. 2) the Skew State $\phi$ and Skew State 1 operations for the next byte. If, however, the skew test has been completed, a SKEW STOP command is generated, switching the skew control center to Skew State 3. There, the displays are enabled (block 57) to show the results for the complete one million byte skew test. Finally, the SKEW TEST CLEAR signal is applied to the skew control center so that the system is reset to START (circle 1 in FIG. 2) in preparation for the running of the next skew test.

However, if the CHAR GATE pulse ends (circle 3 in FIG. 2) before one of the bits in a byte is IN, the character is not complete (i.e., the CHAR COMPLETE signal is not generated, and the skew test can not proceed in its normal manner. Rather, the error condition called BIT DROPOUT has been detected. Consequently, (circle 4 in the skew control center switches to Skew State 4 (circle 4 in FIG. 3). There, the lead-lag circuitry and the instantaneous counters are reset (block 58) to prepare for the next byte of information. Finally, the BIT DROPOUT indicator is set (block 59) to alert the operator that the skew test is erroneous.

If the CHAR GATE pulse has not ended, but BIT OVERRUN is detected (circle 5 in FIG. 2), the skew control center switches to Skew State 5 (FIG. 3) where the BIT OVERRUN indicator is set (block 60). The BIT OVERRUN sense circuit is also reset (block 61) in preparation for the next byte to be tested, while the lead-lag circuitry and the instantaneous counters are reset (block 62) to prepare for the next byte of information. Finally, when the CHAR GATE pulse does end, the skew control center returns to START (circle 1 in FIG. 2) a new skew test.

Figure 4:
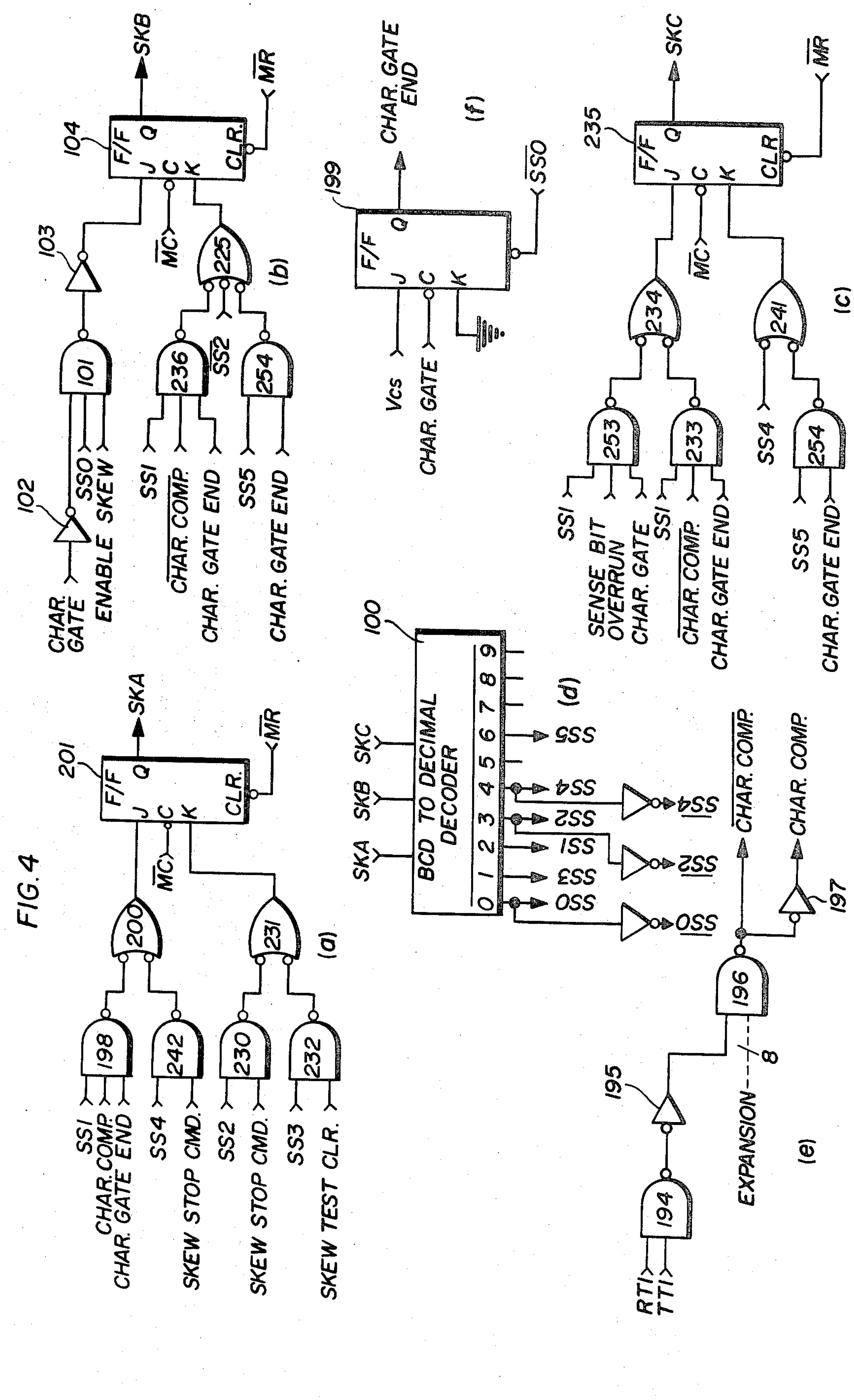
FIGS. 4 and 5 are schematic logic diagrams of several circuits comprising the skew control circuit.

In FIG. 4, the skew control center is shown in greater detail. As previously mentioned, the control center generates internal control signals for conditioning other circuits in the skew measurement circuit (e.g., the instantaneous skew counter, the decrement circuit, etc.) to perform their required operations. To generate the requisite control signals in the proper time sequence, a three bit binary code comprising the outputs SKA, SKB and SKC of three corresponding logic channels (FIGS. 4a, 4b and 4c) is developed responsive to the various external and feedback signals applied to the skew control center. The resultant binary code is representative of the skew state to which the skew measurement circuit should be conditioned at a particular point in the skew test. The SKA, SKB and SKC control signals are subsequently applied to the corresponding inputs of a "binary-coded-decimal (BCD) to decimal" decoder 100 (FIG. 4d) where the three bit binary code is converted into its decimal equivalent. Each decimal output of decoder 100 is, in turn, assigned to correspond to a particular skew state. For example, the decimal output 0 corresponding to the skew state 0 (SS0) control signal is developed when the binary code 000 is applied to the decodes inputs SKA, SKB and SKC. On the other hand, the decimal output 2, corresponding to the binary code 010, represents the skew state 1 (SS1) control signal. Similarly, a decimal 1 output corresponds to the SS3 control signal, and the decimal 3 output is associated with the SS2 control signal.

Initially, the SKA, SKB and SKC input signals coupled to decoder 100 during skew state 0 are low (L), or 0, so that a SS0 control signal is produced. When the operator initiates a skew test, the SS0 control signal and the ENABLE SKEW signal are applied to the corresponding inputs of NAND 101 in the SKB channel. Before the first byte of the skew test is detected, the character gate (CHAR GATE) signal coupled to inverter 102 is low (0) so that all of the inputs to NAND 101 are high (1), developing a low (0) output. Consequently, after inversion by inverter 103, the signal applied to the J input of SKB flip-flop 104 is high (1). The SKB flip-flop 104, which is negative-edge triggered, is then "set" to produce a high-level, or 1, pulse at its Q output coincident with the falling edge of the clock pulse (MC) applied at its clock input C. Consequently, when the high (L) SKB output signal is coupled to the corresponding SKB input of decoder 100, the resultant binary code applied thereto is 010. This is decoded to provide a high (1) SS1 signal at the decimal 2 output of decoder 100. Accordingly, the SS1 control signal may be generated only when there is no character gate.

Figure 5:
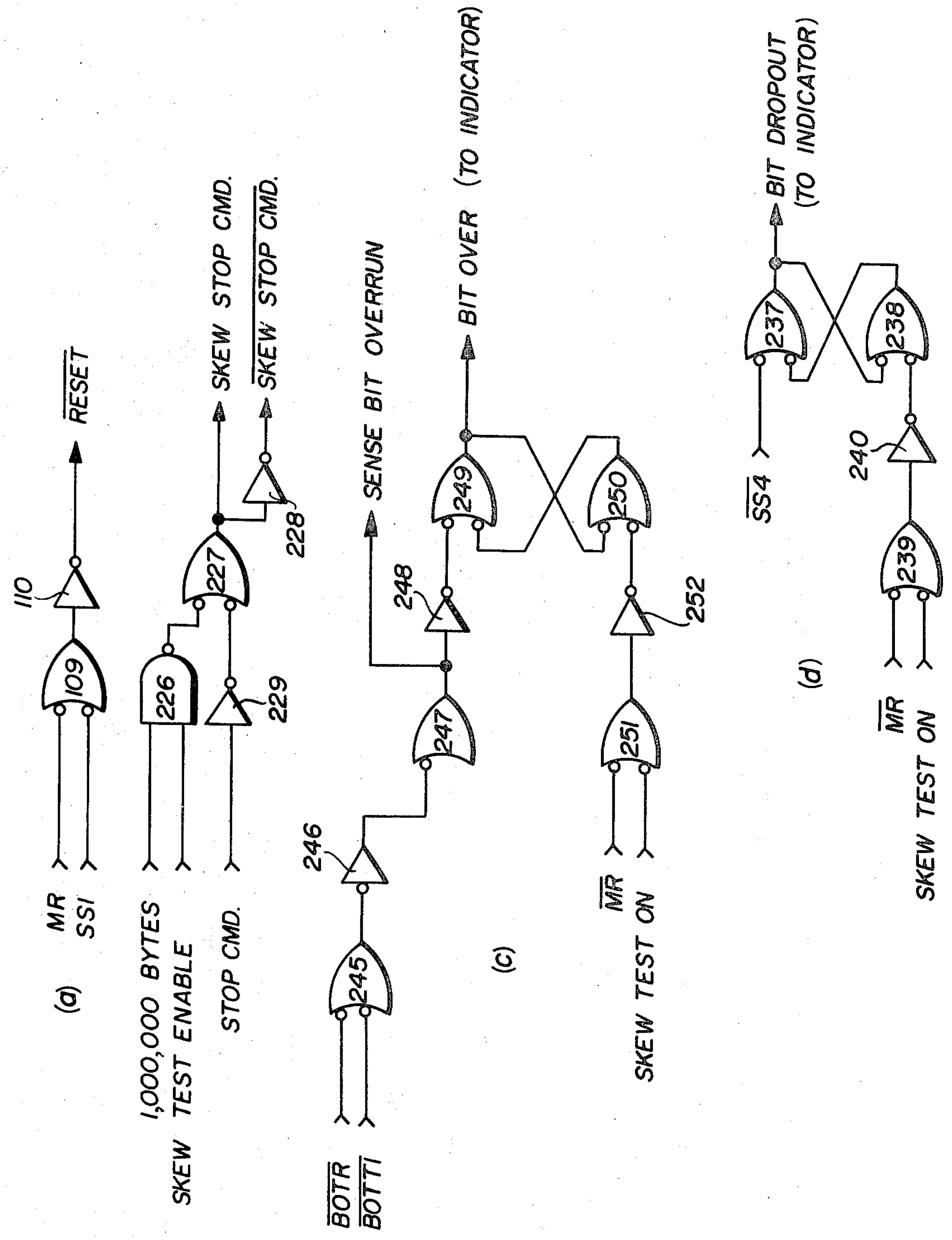
Figure 6:
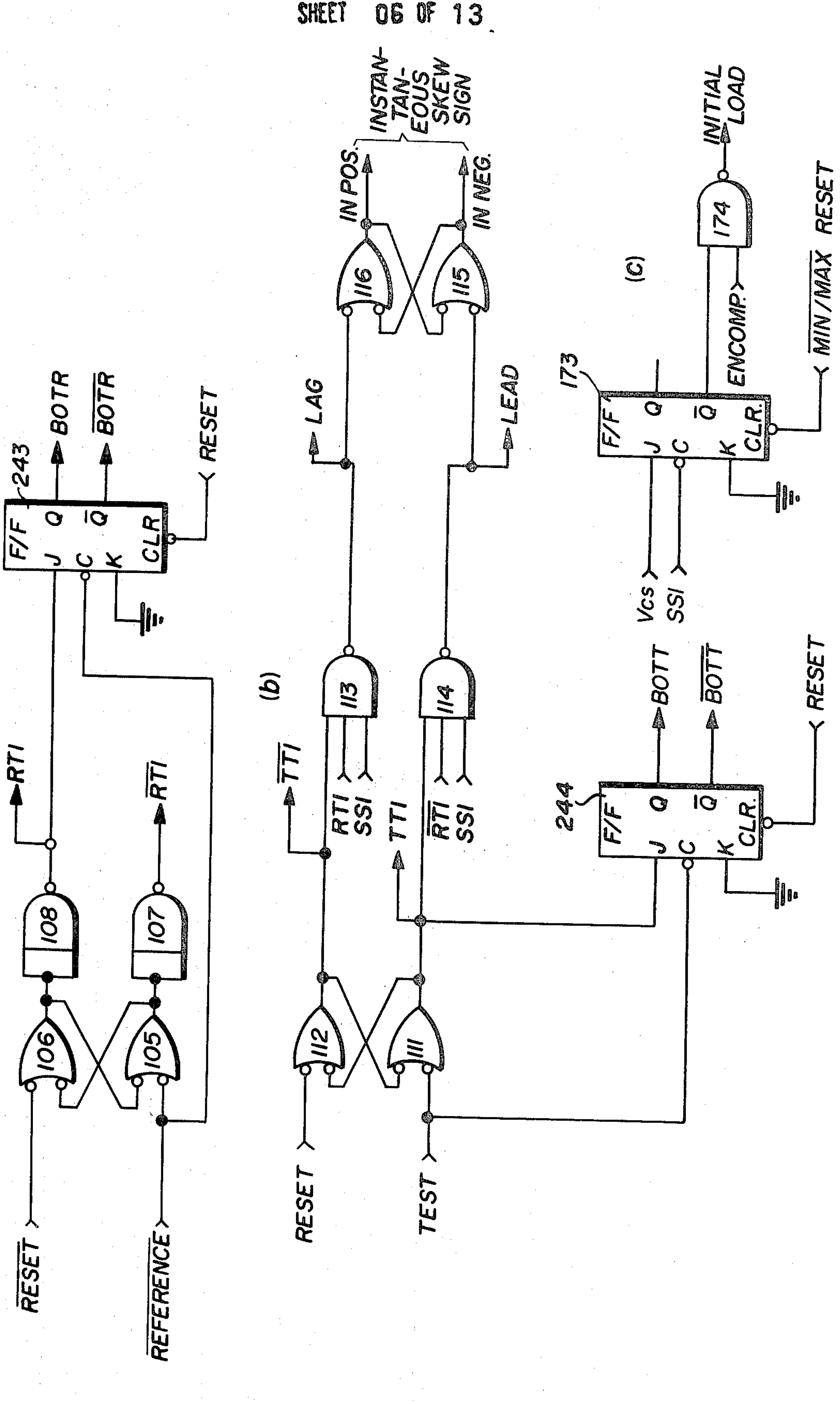
FIG. 6 is a schematic logic diagram of the lead-lag decision circuitry.

The lead-lag decision circuitry for determining whether the test bit leads or lags the reference bit in a particular byte is shown in FIG. 6. There, a REFERENCE TRACK IN signal is applied to the input of NAND 105 which together with NAND 106 comprises an RS flip-flop. The REFERENCE TRACK IN signal is a series of negative pulses from the read amplifier which are coincident with the bits in the reference channel of the tape. Accordingly, the output of NAND 105 is "set" by the negative REFERENCE TRACK IN pulse to provide a high level at its output while a low level is produced at the output of NAND 106. The output of NAND 105 and NAND 106, are, in turn, coupled to inverter NANDS 107 and 108, respectively; consequently, the RTI signal at the output of NAND 107 is a low true level with its falling edge coinciding with the lead-ing edge of the reference bit that has been detected. The RTI signal developed at the output of NAND 108 will be a complementary high true level. Both the RTI (low) and RTI (high) levels will continue until the flip-flop is "reset" by a TRACK RESET pulse applied to NAND 106. This pulse is developed by the logic circuitry shown in FIG. 5*a* whenever Skew State 1 ends (i.e., SS1=0) or the operator applies the master reset (MR) signal. In either case, the low (0) signal applied to NAND 109 produces a negative TRACK RESET pulse at the output of inverter 110. Thus, both the RTI and RTI levels will generally begin with the detection of the reference bit and continue until SKEW State 1 ends.

Similarly, another pair of complementary output levels, TTI (low) and TTI (high), are developed by a second flip-flop comprising NANDs 111 and 112. There, the TRACK RESET signal is applied to the input of NAND 112 while a TEST TRACK IN signal from the read amplifiers is applied to NAND 111. In this case, however, the high true TTI and low true TTI levels developed at the outputs of NANDs 111 and 112, respectively, begin with the arrival of the test bit at the tape head and continue until the SS1 control signal falls to its low (0) state. Accordingly, the RTI, RTI, TTI, and TTI levels all terminate concurrently (i.e., with the end of Skew State 1), but depending on whether the reference or the test bit arrives at the tape head first, the time duration of the RTI and RTI signals will differ from that of the TTI and TTI signals.

The TTI and RTI signals along with the SS1 control signal are subsequently applied to the inputs of NAND 113 to generate a LAG signal if the test bit arrives before the reference bit during Skew State 1. More particularly, the negative TTI pulse will encompass the positive RTI pulse applied to NAND 113 if the test bit procedes the reference bit. But, if the RTI pulse begins before the TTI signal goes low, all the inputs to NAND 113 will be high at that instant, and a negative-going LAG pulse will be generated at its output, continuing until the TTI pulse occurs. Thus, in addition to indicating that the test bit lags the reference bit, the LAG pulse is representative of the time skew between the two bits.

In like manner, the positive TTI and negative RTI signals are applied to the inputs of NAND 114 together with the SS1 control signal. Thus, if the test bit leads the reference bit, the high TTI pulse is applied to NAND 114 before the reference bit sends the RTI signal low, and a LEAD pulse is generated at the output of NAND 114. Here, the negative-going LEAD pulse begins with the arrival of the test bit and continues until the reference bit is detected, indicating that the test bit leads the reference bit. The time interval which the LEAD pulse spans again indicates the skew between the two bits.

The LEAD and LAG signals are further coupled to the inputs of a flip-flop comprising NANDs 115 and 116. The flip-flop is effective to generate an IN NEG (i.e., negative instantaneous skew) signal whenever the LEAD pulse is applied to NAND 115 thereby indicating that the test bit trails the reference bit. Similarly, a high IN POS (i.e., positive instantaneous skew) signal is developed whenever the LAG pulse is applied to NAND 116, indicating reference bit in a particular byte leads the corresponding test bit. Thus, the sign of the instantaneous skew may also be derived from the lead-lag decision circuitry.

Figure 7:
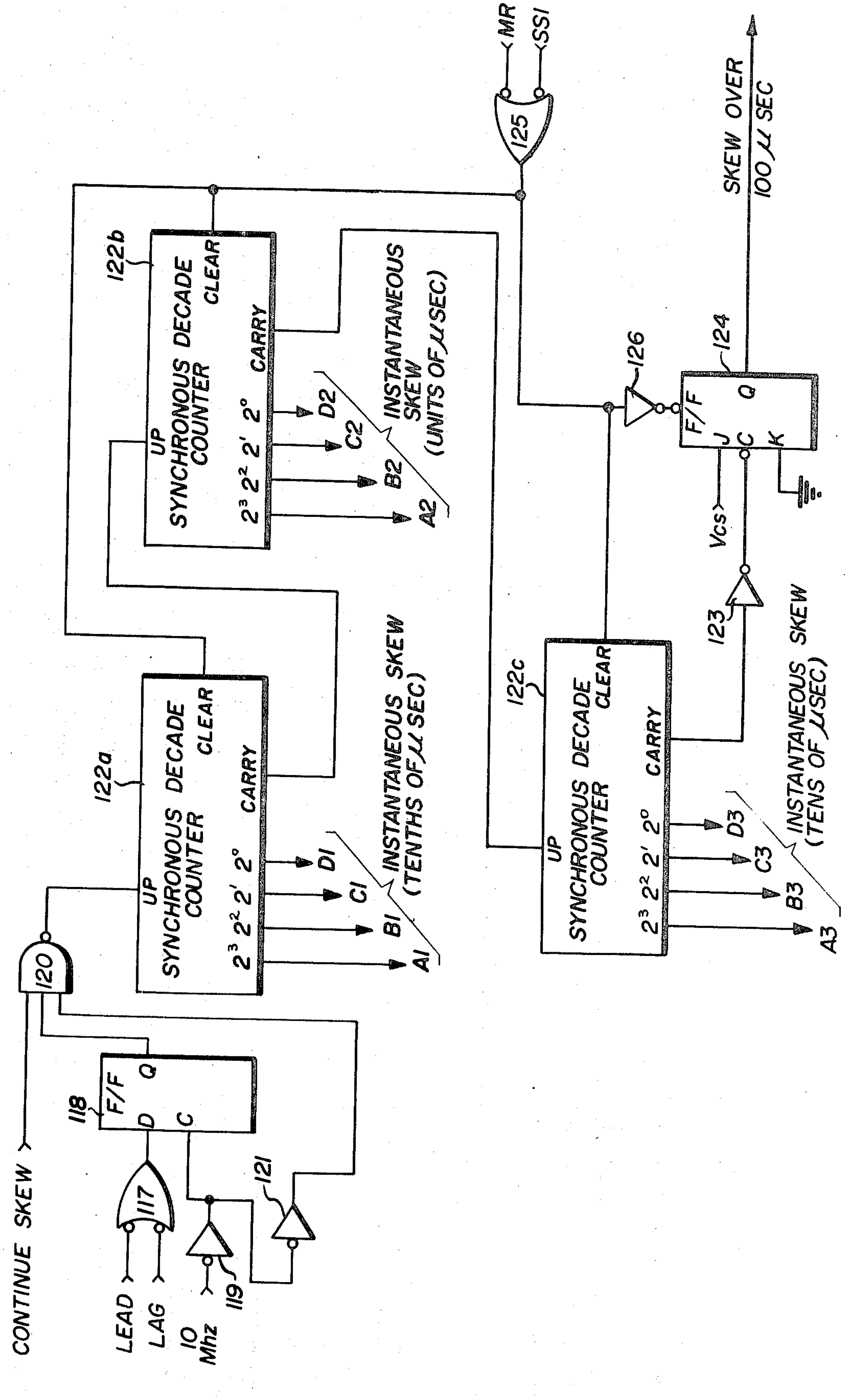
FIG. 7 is a schematic logic diagram of the instantaneous skew counter.

In FIG. 7, the LEAD or LAG "low true" pulses developed in the lead-lag decision circuitry (FIG. 6) are alternatively applied to the corresponding inputs of a NAND 117 in the instantaneous skew counter. There, the resultant pulse developed at the output of NAND 117 is applied to the D input of a DC flip-flop 118 while a 10 Mhz clock pulse train is coupled to its clock input (C) through inverter 119. This, in effect, synchronizes the LEAD or LAG pulse with the clock pulses to prevent the output of NAND 120 from being too short to trigger the counter correctly. Thus, when the pulse from output Q of flip-flop 118 are applied to a NAND 120, they are synchronized with the 10 Mhz clock pulses also applied thereto through inverters 119 and 121. If the skew test is still in progress, the CONTINUE SKEW is also coupled to NAND 120, so that pulses occurring at a 10 Mhz rate (i.e., one-tenth microsecond intervals) for the duration of the LEAD or LAG signal, whichever the case may be, are developed at the output of NAND 120.

Accordingly, when the output of NAND 120 is coupled to the UP input of the first of three serially-connected synchronous decade counters 122, counter 122*a* will count the one-tenth microsecond pulses. More particularly, the "tenths" counter 120*a* counts 10 pulses and then generates a carry signal at its CARRY output. Counter 120*a* is returned to its zero count, and the carry signal is coupled to the UP input U of the "units" counter 120*b* generating one count therein. Thus, units counter 120*b* likewise counts to 10 and generates a carry signal which is applied to the "tens" counter 120*c*. For example, if the skew represented by the LEAD or LAG signal is 53.7 microseconds, the "tenths " counter 120*a* will ultimately count to seven "units" counter 120*b* to three and "tens" counter 120*c* to five. The resultant signals at outputs A1, B1, C1, D1 of counter 120*a* provide a binary-coded-decimal (BCD) representation of the number of pulses counted. Similarly, the outputs A2, B2, C2, D2 of "units" counter 120*b* and the outputs A3, B3, C3, D3 of "tens" counter 120*c* express a binary code representative of the count reached by that particular counter during the skew test. If, for example, the instantaneous skew is 53.7 microseconds, the BCD outputs of counters 120*a*, 120*b*, 120*c* would be 0111, 0011, 0101, respectively.

If the instantaneous skew so measured exceeds the maximum counting capabilities of the counter 120 (i.e., instantaneous skew 100 microseconds), the carry signal generated by counter 120*c* is coupled through inverter 123 to the clock input (C) of JK flip flop 124. The J input of flip-flop 124 is coupled to a source of high d-c potential (V*cs*) while its K input is connected to ground. Accordingly, the leading edge of the carry signal triggers flip-flop 124 so that a signal generated at its Q output indicates that the instantaneous skew exceeds 100 microseconds.

When Skew State 1 has been completed (i.e., SS1 is low) or the operator applies the master reset (MR), a reset signal will be developed at the output of NAND 125. The reset signal is then applied to the CLEAR inputs of the synchronous decade counters 120, returning them to the zero count states. Further, the reset signal is also coupled through inverter 126 to the CLEAR gate of flip-flop 124, resetting it for the next instantaneous skew measurement.

Figure 8:
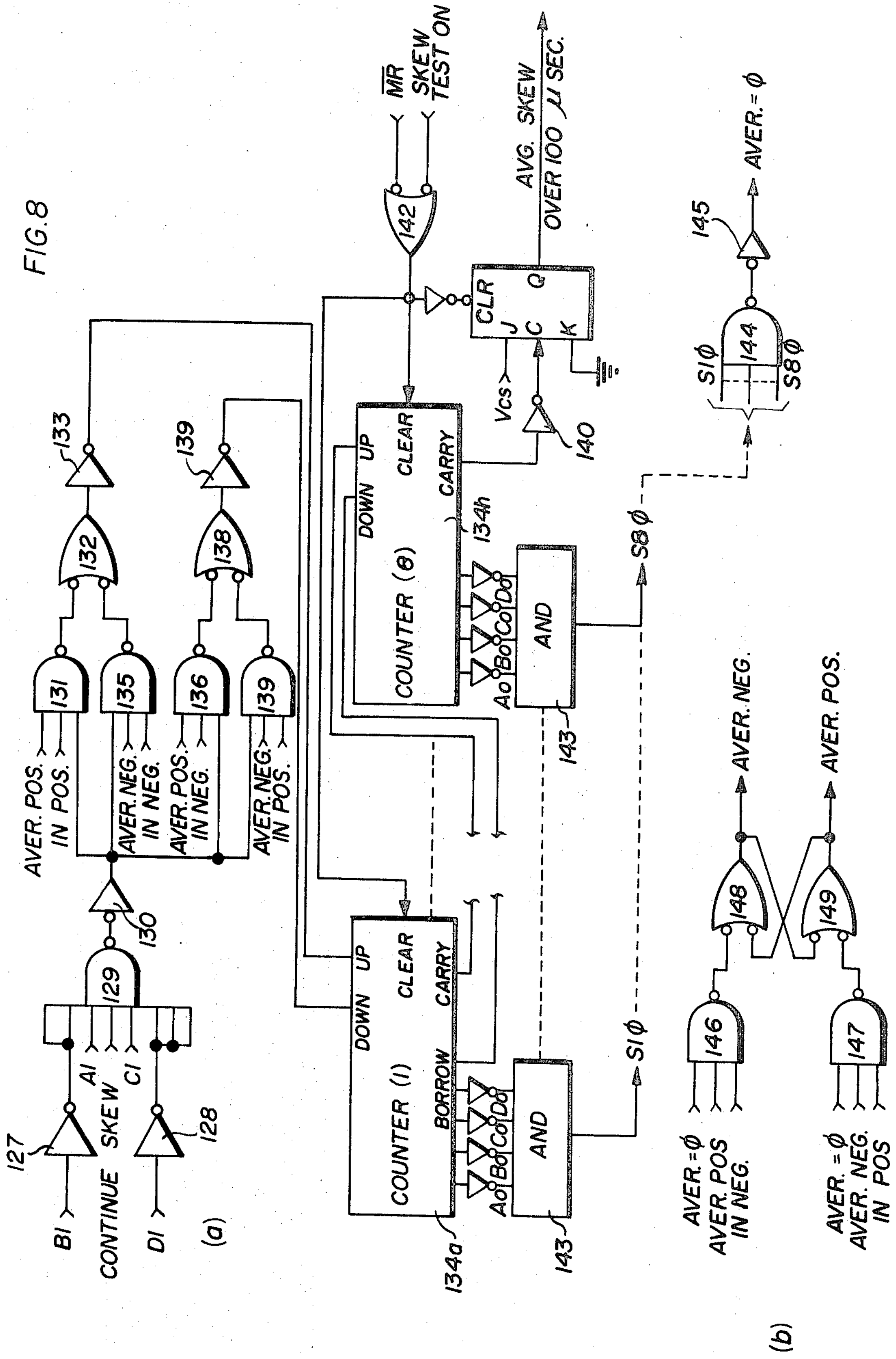
FIG. 8 is a schematic logic diagram of the average skew counter.

The outputs (A1–D1) of counter 120*a* in the instantaneous skew counter are coupled to the average skew counter shown in FIG. 8. There, it may be seen that the B1 and D1 outputs of counter 120*a* are coupled through inverters 127 and 128, respectively, to the inputs of NAND 129 while the A1 and C1 outputs are coupled directly thereto. During the skew test, CONTINUE SKEW signal is also applied to NAND 129. Accordingly, NAND 129 generates a low-level output pulse when ever the outputs of counter 120*a* are 0101 (i.e., 0.5 decimal). Thus, as long as the instantaneous skew counter is counting, a series of one microsecond pulses is developed at the output of the inverter 130 coupled to the output of NAND 129.

The one microsecond pulses corresponding to the instantaneous skew are, in turn, counted by eight serially-connected synchronous up/down decade counters 134 and totaled for the entire one million byte skew test to determine the average skew. For an accurate determination of the average skew, however, the instantaneous skew must be added to the sum total of the instantaneous skews in the average skew counter only if the sign of the instantaneous and average skews are the same. If, for example, the instantaneous skew is negative while the average skew is positive, adding the negative instantaneous skew to the average counter would distort the average skew measurement. Consequently, when the sign of the instantaneous skew differs from the average skew's sign, substraction should result.

Accordingly, means are included to determine whether the average skew at any particular time is positive or negative, generating an AVG POS signal if it is positive or an AVG NEG signal if negative. Take, for example, the case where the lead-lag decision circuitry (FIG. 6) determines that the instantaneous skew is positive and generates an IN POS signal. If the average skew is also positive, the AVG POS signal will be generated, too. Accordingly, when the IN POS and AVG POS signals are applied to NAND 131 along with the one microsecond pulses from inverter 130, a negative-going pulse is generated at the output of NAND 131 and coupled through NAND 132 and inverter 133 to the UP input of the first up/down counter 130*a*. The CARRY output of each counter 130 is coupled to the UP input of the subsequent counter in the series so that the one microsecond pulses are in a manner similar to that in which they are counted by the instantaneous counters 120 (FIG. 7). A total of 100 million of the 1 microsecond pulses can be counted in this manner so that the average skew over a one million byte test run can be obtained by placing the decimal point between the sixth and seventh counters (not shown). Thus, an average skew of up to 100 microseconds can be measured. Similarly, if the average and instantaneous skews are both negative, the AVER NEG and IN NEG signals applied to NAND 135 together with the one microsecond pulses from inverter 130 will generate a negative pulse at the output of NAND 135. The pulse is then coupled through NAND 132 and inverter 133 to the UP input of counter 134*a*, initiating counting therein.

On the other hand, if the AVER POS and IN NEG signals or, alternatively, the AVER NEG and IN POS signals are applied simultaneously to their respective inputs at 136 NAND or NAND 137 with the 1 microsecond pulses from inverter 130, with the 1 microsecond pulses from inverter 130, negative-going pulse will be developed at the appropriate one of the two outputs. The pulse is, in turn, coupled through NAND 138 and inverter 139 to the DOWN input of counter 134*a*. The up-down counters 134 further have their BORROW outputs coupled to the DOWN input of the subsequent counter in the series. Thus, if the signs of the instantaneous skew and the average skew are not the same, the counters will count "down" toward zero. Accordingly, the average skew counters are effective to add or substract the instantaneous skew, as the case may be, to the total instantaneous skew previously registered therein. The CARRY gate of the last up/down counter 134h is coupled through inverter 140 to the JK flip-flop 141 further having its J input coupled to source of d-c potential ($V_{CS}$) and its K input grounded. Thus, when the average counters 134 have reached their maximum counting capacity, a signal is generated at the Q output of flip-flop 141 indicating that the average skew exceeds 100 microseconds. Also, the master reset (MR) and/or the SKEW TEST ON signal can be applied to NAND 142 to generate a reset signal. When applied to the CLEAR gates of the counters 134, upon completion of the skew test, the counters 134 are returned to their zero count. The reset signal is further applied to the CLR gate of flip-flop 142 to reset it for the beginning of a new skew test.

The previously mentioned means provided to determine the average skew is positive or negative includes eight ANDs 143, one being coupled to the outputs of each counter 134 through the inverters. The output of each AND 143 is, in turn, coupled to the input of NAND 144 where a pulse is produced at its output and coupled to inverter 145 only if each output of AND 143 is low. Thus, the AVER = $\phi$ signal is developed at the output of inverter 145 only when the average skew is zero. Of course, the average skew is zero before the skew of the first byte in a skew test is measured, or it may also be zero if the instantaneous skew or a number of bytes at some point in the test exactly cancel. When the average skew is indeed zero, the resultant AVER = $\phi$ signal is applied to the AVER = $\phi$ inputs of a pair of NANDs, 146 and 147, in FIG. 8(b). NANDs 146 and 147, in turn, provides the input signals to a pair of NANDs 148 and 149, respectively, comprising a flip-flop. The complementary IN NEG and IN POS signals generated by the lead-lag decision circuitry (FIG. 6) to indicate whether the sign of the instantaneous skew is positive or negative are also applied to NANDS 146 and 147, respectively. Further, the AVER POS and AVER NEG signals generated at the outputs of NANDS 149 and 148, respectively, are coupled back to the inputs of NANDs 146 and 147, respectively, in a feedback manner.

Operationally, if the instantaneous skew of a particular byte is positive a pulse will be applied to the IN POS input of NAND 147. If, for purposes of the present operational description, it is assumed that the average skew just prior to the previous byte had been negative so that the AVER NEG input and output were both high and that furthermore the instantaneous skew of the previous byte had just returned the average skew counters to zero, then the AVER NEG and AVER = $\phi$ inputs to NAND 147 are high, or 1. Thus, when the IN POS signal is also applied to NAND 147, the flip-flop is reset so that the high AVER POS signal is developed at the output of NAND 149.

Referring now to FIG. 9(a), there is shown a circuit for developing an enable compare (ENCOMP) signal during Skew State 1 after both the reference and test bits have been detected (i.e., counting has ceased). More particularly, the SS1 control signal from the skew control center and the RTI and TTI signals from the lead-lag decision circuitry are coupled to the corresponding inputs of NAND 150, generating a low (0) output signal. This signal is then applied through inverter 151 to the J input of a JK flip-flop 152 which is further coupled to a second JK flip-flop 153 in the conventional Master-Slave configuration. The K input of flip-flop 152 is directly connected to the output of NAND 150 which its clock input c is coupled to the master clock (MC). Accordingly, with the J input high (1), the trailing-edge of the master clock (MC) pulse triggers flip-flop 152. The resultant output signals developed at the Q output of flip-flop 152 and the Q output of flip-flop 153 are coupled to NAND 154. The CONTINUE SKEW signal is also applied thereto so that the resultant output pulse after inversion by inverter 155 serves as high (1) enable compare (ENCOMP) signal. This signal, in turn, enables the maximum and minimum compare and storage circuits so that a determination can be made as to whether the instantaneous skew is a new maximum or minimum.

In FIG. 9(b), a register counter comprising three serially-connected synchronous up/down decade (register) counters 156 is provided each counter 156 having its inputs coupled to the corresponding outputs of the three synchronous decade counters 122 forming the instantaneous skew counter (FIG. 7). When the skew test has been running for some time, the maximum value of instantaneous skew to that point in the test will be maintained in the register counters 156 and represented as a binary-coded-decimal (BCD) signal at their outputs (e.g., $A_{00}$, $A_{10}$, $A_{20}$, $A_{30}$). The outputs of each counter 156 are, in turn, connected to the corresponding inputs (A*in*) of three serially-connected magnitude comparators 157. Each of the magnitude comparators 157 also derives a second set of input signals, identified generally at B*in*, directly from the corresponding instantaneous counters 122 (FIG. 7). The magnitude comparators 157 are effective to determine whether the skew measured by the instantaneous 122 counters 122 exceeds the maximum skew value stored in register counters 156. The results of the comparison may be manifested as one of three possible output signals. A BGTRA OUTPUT signal from comparator 157 indicates that the absolute value of the instantaneous skew is greater than the instantaneous skew and an A=B output indicates that they are identical.

Figure 10:
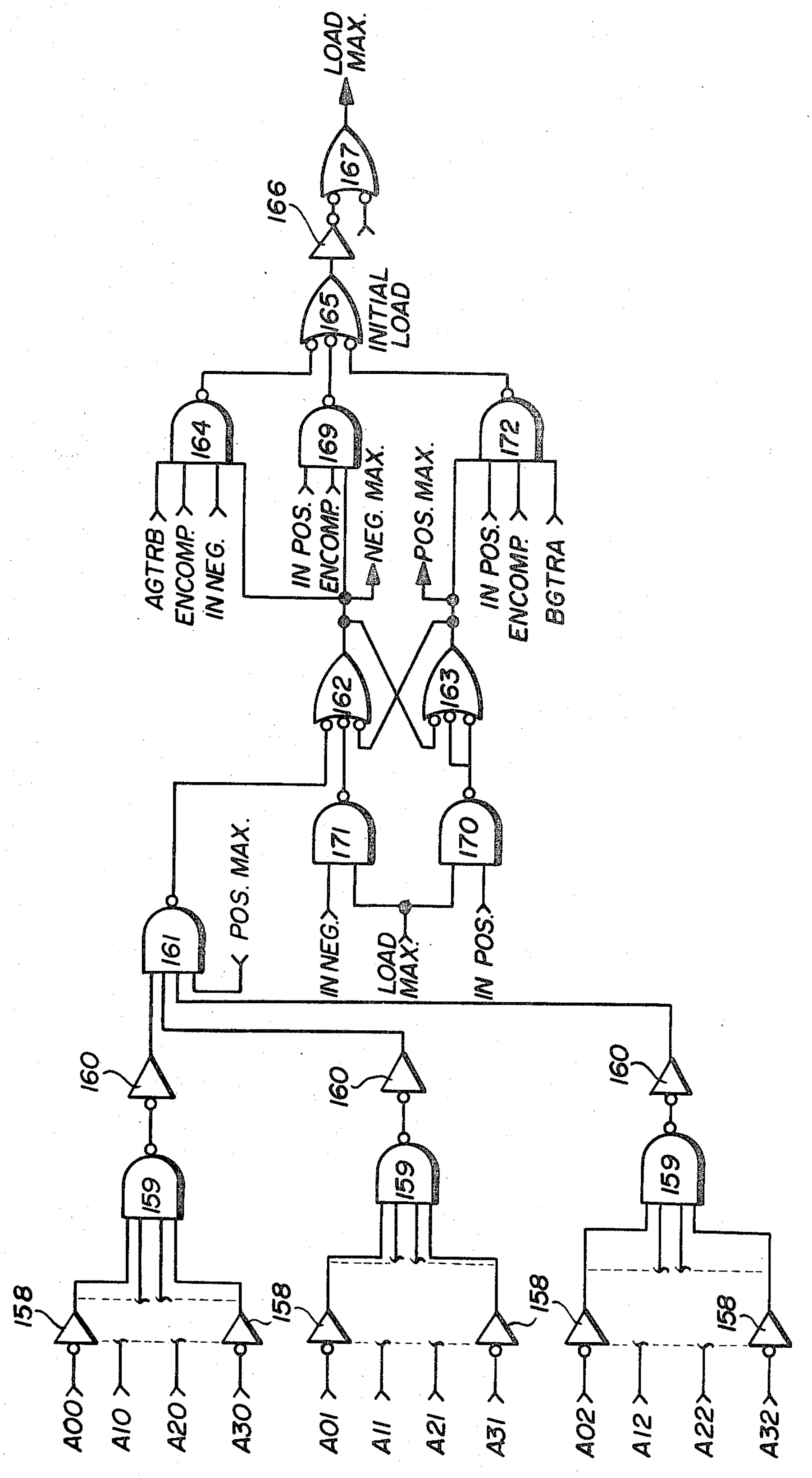

In FIG. 10, it may be seen that the outputs of each particular register counter 156 are, in turn, coupled through an inverter 158 to the input of a NAND 159. The output of each NAND 159 is then coupled through an inverter 160 to the input of NAND 161. It will be appreciated that the inputs to the inverters 160 will be low only when the outputs from the corresponding register counter 156 are zero. Further then, NAND 161 can generate an output signal only if each register counter 156 is maintained in its zero count. Thus, in most circumstances the output signal coupled from NAND 161 coupled to NAND 162 is high.

NAND 162 is further combined with NAND 163 to form a flip-flop for determining whether the maximum value of instantaneous skew stored in the register counters 156 is positive of negative. If a "negative" maximum is stored in the register counters 156, the NEG MAX signal will be generated at the output of NAND 162. On the other hand, if the stored maximum is "positive," the POS MAX will be developed by NAND 163.

It will be assumed for purposes of the present discussion that the stored maximum skew is initially negative. Then, if the instantaneous skew is negative, but less negative than the maximum skew already stored in the register counters 156, the magnitude comparators 157 generate an AGTRB output signal indicating that the absolute value of the instantaneous skew is less than the absolute value of the maximum stored value (i.e., A*in* > B*in*). The AGTRB is then applied to NAND 164. The IN NEG and NEG MAX signals are also coupled to NAND 164 so that a negative pulse is produced at its output when the ENCOMP signals is subsequently generated. The pulse is coupled through NAND 165 and inverter 166 to NAND 167 where a LOAD MAX signal is generated, indicating that a new maximum skew value has been found. The high LOAD MAX signal is then applied through inverter 168 (FIG. 9) to the low-level LOAD input of the register counters 156. Accordingly, the new maximum value is loaded into the register counters 156 where it will be compared with the instantaneous skews for later bytes.

If the next instantaneous skew measurement is positive, there is no need to compare the absolute values of the instantaneous skew and the maximum stored value because the positive instantaneous skew is always the maximum when compared with a negative stored value. Consequently, the IN POS and ENCOMP signals applied to NAND 169 along with the NEG MAX signal generate a LOAD MAX signal at the output of NAND 167. The IN POS signal is also coupled to NAND 170 together with the LOAD MAX signal to reset the flip-flop comprising NANDs 162 and 163 so that the POS MAX signal is developed at the output of NAND 163.

Figure 9:
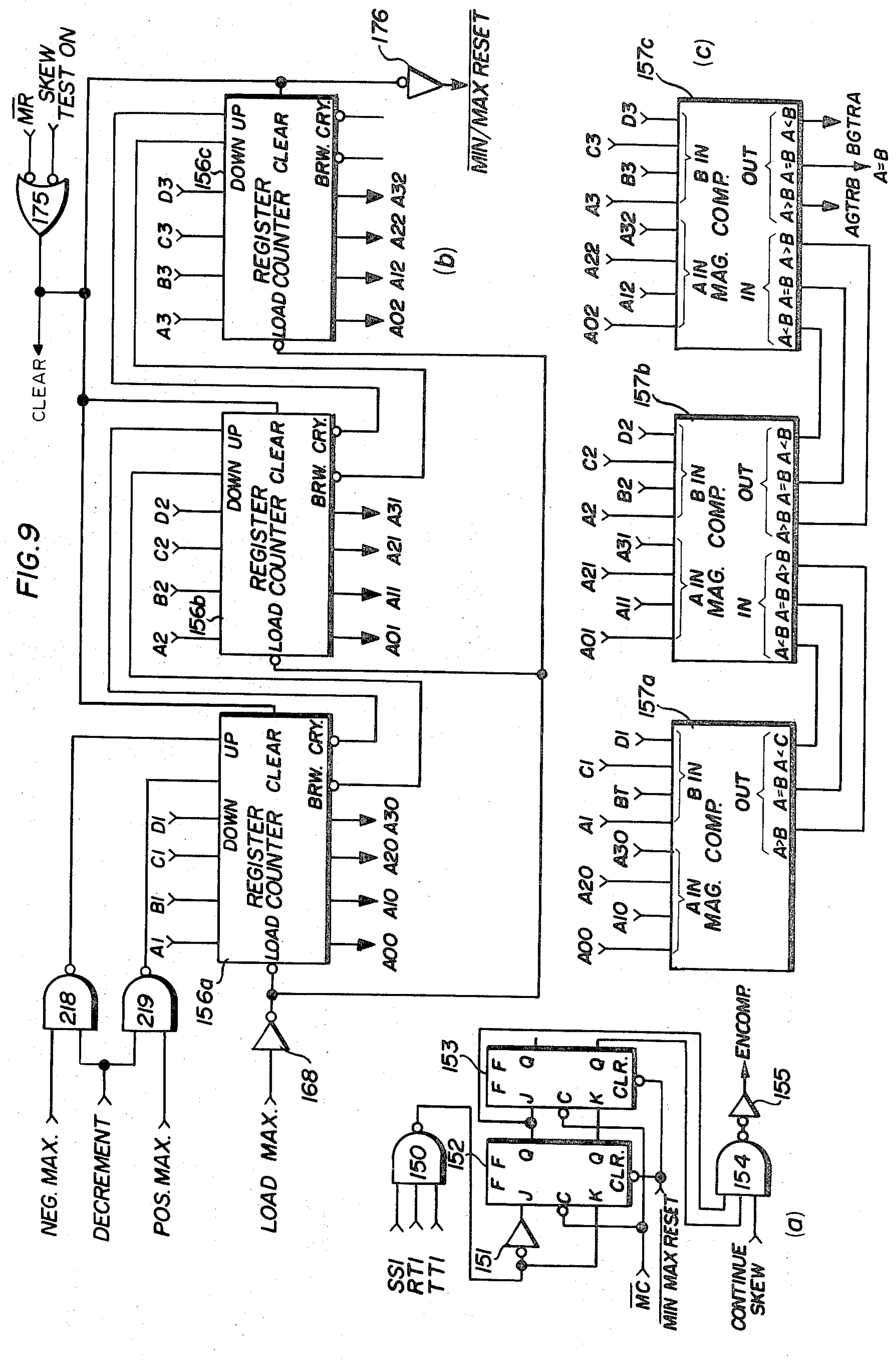
FIGS. 9 and 10 are schematic logic diagrams of the maximum skew storage and comparison circuits.

Consequently, if an even more-positive instantaneous skew is later detected, the magnitude comparators 157 generate a BGTRA signal, indicating that the absolute value of the instantaneous skew exceeds that of the maximum stored value. The BGTRA signal is then applied to NAND 172 along with the IN POS signal and the ENCOMP signal. Since the previous maximum was also positive, the POS MAX signal is applied to NAND 172 so that a LOAD MAX signal is developed at the output of NAND 167. Thus, the new maximum is loaded into the register counters 156 (FIG. 9).

A problem may arise, however, if a positive stored maximum is subsequently decremented past zero so that it is in reality negative even though the flip-flop comprising NANDs 162 and 163 is still set to produce the POS MAX signal. Thus, if the instantaneous skew is less negative than the decremented stored minimum value, the magnitude comparators 157 will produce the AGTRB signal indicating that the absolute value of the decremented maximum is greater than that of the instantaneous skew. However, since the POS MAX signal indicates that the stored value is positive, the instantaneous skew can not be stored as the new maximum by NAND 164. Consequently, special provision is made for circumstances such as these. That is, the POS MAX signal will be applied to the corresponding input of NAND 161 so that when the other inputs to NAND 161 indicate that the register counters 156 have reached zero it will reset the flip-flop. Accordingly, NAND 162 will generate the NEG MAX signal at its output, and NAND 164 can then cause the LOAD MAX signal to be generated so that the negative instantaneous skew is stored as the new maximum value.

An INITIAL LOAD input may also be applied to NAND 167 thereby generating a LOAD MAX signal for loading the initial instantaneous skew of the first byte in the skew test into the maximum counter register. The INITIAL LOAD signal is developed by the circuit shown in FIG. 6*c*. More particularly, the J input of a JK flip-flop 173 is coupled to a source of d-c potential, V*cs*, while its clock input C is coupled to the SS1 output of decoder 100 (FIG. 4). Its K input is grounded. For the first byte in the skew test, the Q output of flip-flop 173 is high during Skew State 1. Thus, when the instantaneous skew of the first byte has been measured, the ENCOMP signal applied to NAND 174 along with Q output signal causes the INITIAL LOAD signal to be generated so that the instantaneous skew is loaded into both the maximum and minimum register counters 156. At the end of Skew State 1 testing for the first byte, the SS1 input goes low, switching the Q output of the negative-edge triggered flip-flop 173 off. NAND 174 is then disabled until the MIN/MIN RESET signal is applied to the CLR input of flip-flop 173. At that time, flip-flop 173 is cleared in preparation for the initiation of a new skew test.

When the one million byte skew test is completed or the operator stops the test, a CLEAR signal is developed at the output of NAND 175 (FIG. 9) responsive to the SKEW TEST ON signal being disabled or the master reset (MR) being applied thereto. The CLEAR signal is applied to the CLEAR inputs of the register counters 156 to return them to zero before the start of the next skew test. The CLEAR signal is also inverted by inverter 176 to provide the MIN/MAX RESET pulse which is applied to flip-flop 173 (FIG. 6*c*).

Figure 11:
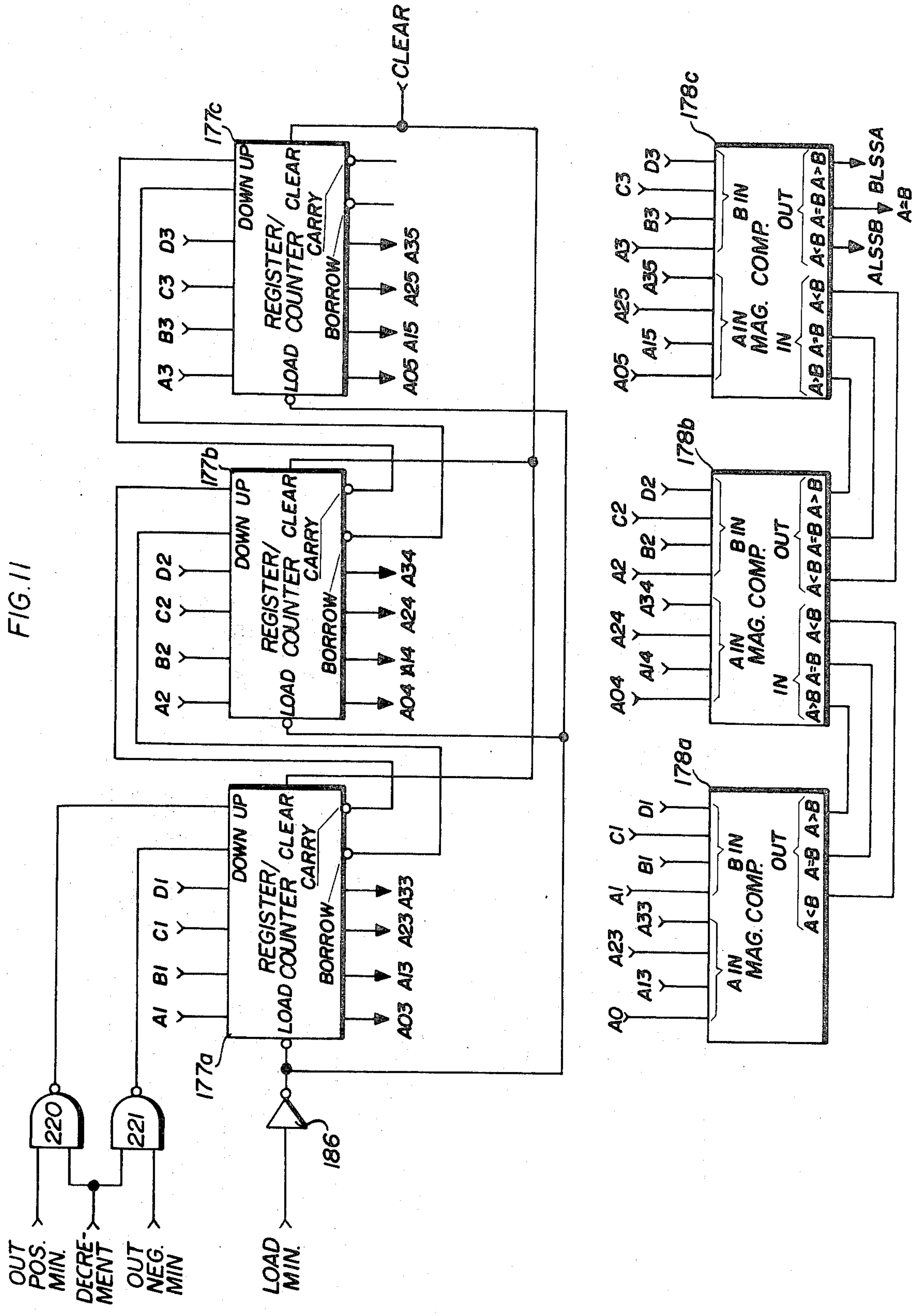
FIGS. 11 and 12 are schematic diagrams of the minimum skew storage and comparison circuits.
Figure 12:
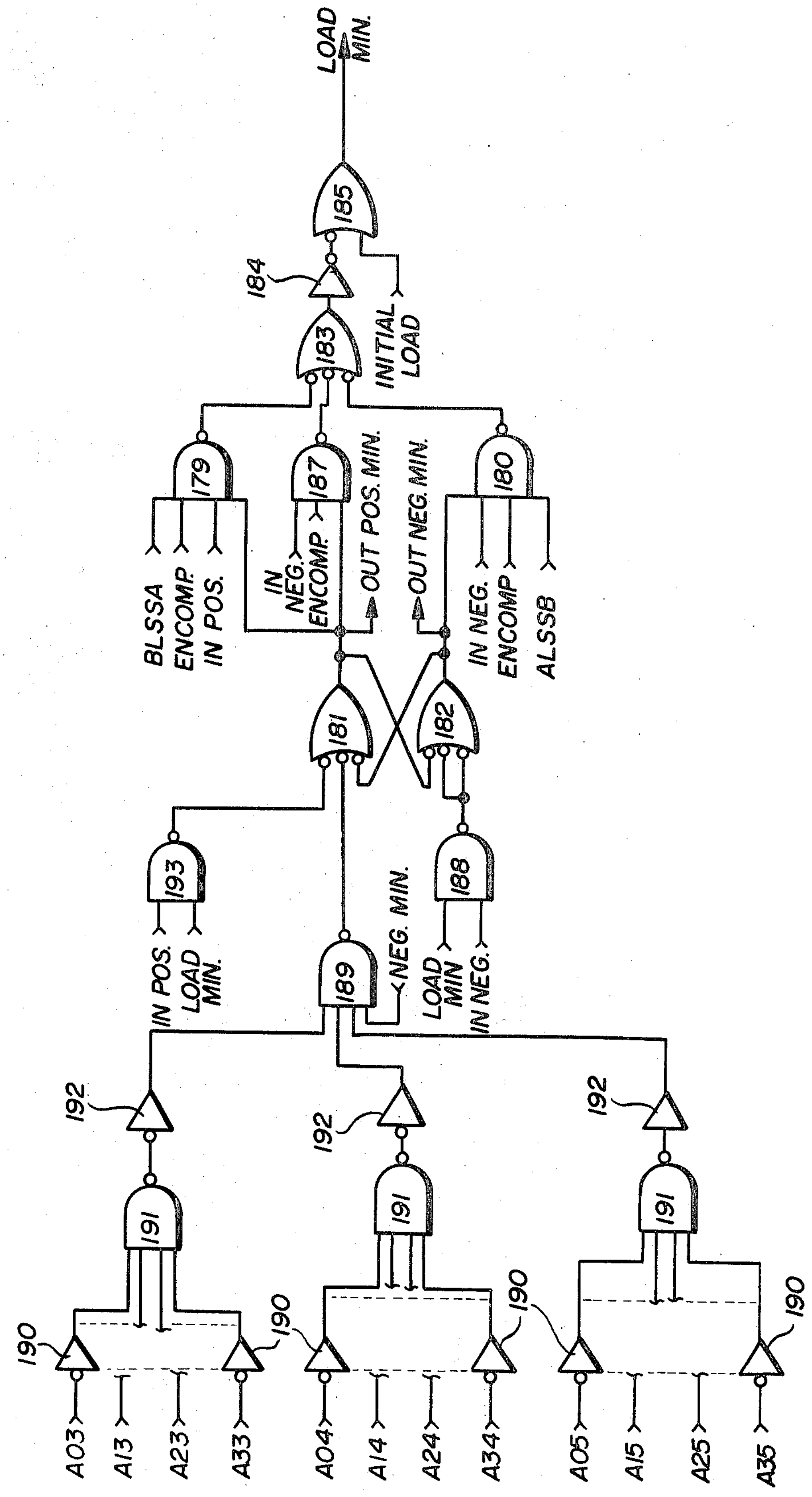

FIGS. 11 and 12 combine to show the minimum skew circuits utilized for determining whether the instantaneous skew is less than the stored minimum value. The operation of the minimum skew circuits is almost identical to that of the maximum skew circuits with only a few minor variations.

For example, the outputs from the synchronous decade counters 122 comprising the instantaneous counter (FIG. 7) provide corresponding inputs to the register counters 177 are, in turn, coupled to the corresponding inputs of the magnitude comparators 178 connected in parallel therewith. The outputs of the instantaneous skew counters 122 also provide a second set of corresponding inputs to the comparators 178. As in the maximum skew circuits, the magnitude comparators 178 compares the absolute value of the instantaneous skew applied to its $B_{in}$ inputs with the stored minimum value applied to its $A_{in}$ inputs. Consequently, if the absolute value of the instantaneous skew is less than the absolute value of the stored minimum, the BLSSA signal is generated. Conversely, if the absolute value of the instantaneous skew exceeds the that of the stored minimum, the ALSSB signal is produced.

The BLSSA and ALSSA signals are, in turn, coupled to NANDs 179 and 180, respectively. A flip-flop comprising NANDs 181 and 182, similar to that provided in the maximum circuit, is also provided. Thus, NAND 181 generates a POS MIN output pulse whenever the stored minimum value is positive, and NAND 182 provides a NEG MIN whenever the stored minimum is negative. The POS MIN and NEG MIN signals are subsequently coupled to NANDs 179 and 180, respectively. The enable compare (ENCOMP) signal is also applied to both NANDs 179 and 180. If it is first assumed that the previously stored minimum was positive, the POS MIN signal is generated high and applied to NAND 179. The BLSSA signal is also generated and coupled to NAND 179 along with the IN POS signal, the instantaneous skew is also positive but less positive than the stored minimum value. In this case, a new minimum value is recognized, and accordingly, the output signal at NAND 179 is applied through NAND 183, inverter 184 and NAND 185 to generate a LOAD MIN signal. This signal is applied through inverter 186 to the LOAD gates of the register counters 177 thereby loading the instantaneous skew into the register counters 177.

If the stored minimum is positive and the instantaneous skew is negative, there is, once again, no need to determine the relative absolute values of the two signals rather, the IN NEG and POS MIN signals are applied along with the ENCOMP signal to NAND 187. When the signal at the output of NAND 187 is coupled to NAND 185, the LOAD MIN signal is generated. The LOAD MIN signal and the IN NEG signal are also connected to NAND 188 which resets the flip-flop comprising NANDs 181 and 182 so that the NEG MIN signal is developed, indicating that the stored minimum is now negative.

When the instantaneous skew is more negative than the stored minimum value, the magnitude comparators 178 will generate the ALSSB signal which is indicative that the absolute value of the minimum skew in the register counters 177 is less than the instantaneous skew's absolute value. Consequently, when the IN NEG signal and the ENCOMP signal are also applied to NAND 180, the LOAD MIN signal is generated. Again, the instantaneous skew value is loaded into the register counters 177 as the new minimum stored value.

A situation may arise, however, where the minimum stored value is decremented from a negative value to some level greater than zero (i.e., positive). This is analogous to the problem caused by decrementing the maximum stored value as previously disclosed. More particularly, the NEG MIN signal is being generated by NAND 182 because the stored value was, at one time, negative. However, after it has been decremented past zero to a positive level, the NEG MIN output is no longer representative of the actual sign of the minimum stored value. Thus, if the instantaneous skew is positive, but less positive than the decremented minimum stored value, the magnitude comparators will generate the BLSSA signal. The IN POS signal is also applied to NAND 179, but the NEG MIN signal is being generated, not the POS MIN. Consequently, even though a new minimum skew has been detected, it cannot be stored in the register counters 177 unless special provisions are made. Accordingly, the NEG MIN signal is coupled to NAND 189 so that the flip-flop comprising NANDs 181 and 182 can be reset when the stored minimum is decremented past zero. The outputs of each register counter 177 are, therefore, coupled through inverters 190 to NANDs 191. Thus, when the decremented stored minimum reaches zero, the inverters 192 coupled to NANDs 191 will provide high (1) input signals to NAND 189. Finally, NAND 181 is reset to provide a POS MIN signal so that the new minimum may be stored. NAND 193 is also provided to reset NAND 181 when the instantaneous skew is positive and the LOAD MIN signal is generated.

The INITIAL LOAD signal is also applied to the corresponding input of NAND 185 to generate a LOAD MIN signal when the instantaneous skew measurement for the first byte is completed. Thus, it may be seen, that the instantaneous skew of the first byte is also loaded into the minimum register counters 177 as well as the maximum register counters 156. Again, the register counters 177 are reset to the zero count responsive to the CLEAR signal generated by NAND 175 (FIG. 9) and applied to their CLR inputs.

Once the instantaneous skew has been determined, added to the average skew counter and compared with the minimum and maximum stored values, the skew control center (FIG. 4) switches from Skew State 1 to Skew State 2, generating an SS2 control signal. More particularly, when both the reference bit and the test bit have been detected, the lead-lag decision circuitry (FIG. 6) generates the RTI and TTI signals. These signals are then applied through NAND 194 and inverter 195 (FIG. 4*e*) to the input of NAND 196, generating the "low-true" character complete (CHAR COMP) signal which is indicative that both bits have been received. The CHAR COMP is further coupled through inverter 197 to develop the "high-true" CHAR COMP signal. NAND 196 is included to provide for expansion to a nine channel test set-up. The CHAR COMP signal is subsequently coupled to NAND 198 in the SKA logic channel (FIG. 4*a*) of the skew control center. The CHAR GATE END input to NAND 198 is developed by the circuit in FIG. 4*f*. Flip-flop 199 has a grounded inverter developing a constant high signal at output Q responsive to the d-c potential (V*es*) applied to its J input. The CHAR GATE is coupled to the clock input C and the K, or reset, input is grounded. Thus, when the positive CHAR GATE pulse drops, indicating that the predetermined time interval for detecting both bits has ended, the negative-edged triggered flip-flop 199 provides a positive CHAR GATE END pulse coincident with the falling edge of the CHAR GATE pulse.

Consequently, all of the inputs to NAND 198 are high after both bits have been detected and the character gate has ended. The resultant output is coupled through NAND 200 to the J input of the SKA flip-flop 201, conditioning it to be responsive to the next negative-edge that occurs. Thus, the master clock (MC) pulse applied to the clock input (C) triggers flip-flop 201 to develop the SKA control signal. The SKA signal is, in turn, applied to the corresponding input of decoder 100. The decoder 100 responsive to the SKA and SKB signals applied thereto, developes a signal at the "decimal 3" output corresponding to the SS2 control signal.

Figure 13:
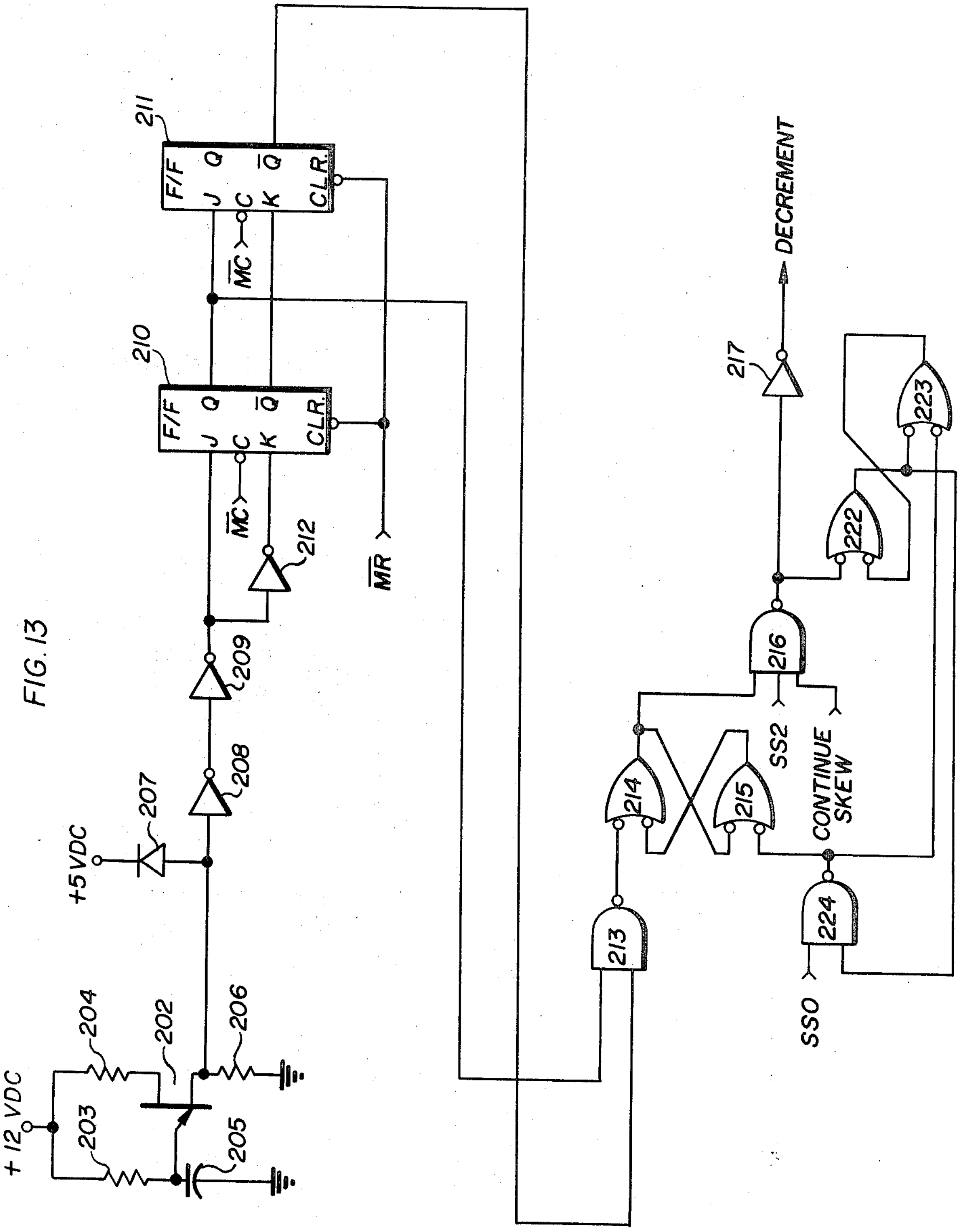
FIG. 13 is a schematic logic diagram of the decrement circuit.

During Skew State 2, the instantaneous skew counter is reset to measure the skew of the next test byte, and the decrement circuit shown in FIG. 13 is enabled. The decrement circuit is effective to decrease the maximum and increase the minimum skew values stored in the maximum and minimum register counters 156 and 177, respectively, at a predetermined rate.

The decrement circuit includes a unijunction relaxation oscillator of standard configuration comprising unijunction (UJT) transistor 202 and its associated circuitry. More particularly, resistors 203 and 204 connect the emitter electrode and the B1 electrode, respectively, of UJT transistor 202 to a source of operating potential (e.g., + 12 vdc). A capacitor 205 also couples the emitter electrode to ground, and a resistor 206 connects its B2 electrode to ground. The rate at which the circuit oscillates can be varied, depending on the values selected for resistor 203 and capacitor 205. In the present embodiment, however, the decrement pulses, which are generated at the frequency determined by the UJT oscillator, occur at a 0.05 hz rate. Thus, a decrement pulse will not be generated during each Skew State 2 interval. Diode 207 is coupled between a source of operating potential (e.g., + 5 vdc) and the B2 and the B2 electrode to limit the d-c potential developed at the B2 electrode so that the associated logic circuitry is not damaged by excessive potentials.

The pulses from the oscillator are, in turn, coupled through inverters 208 and 209 to the J input of JK flip-flop 201 which is interconnected with JK flip-flop 211 in a Master-Slave arrangement. In this configuration, the J and K inputs of the Slave flip-flop 211 are connected to the Q and Q outputs, respectively, of the Master flip-flop 210. The oscillator pulses are also coupled to the K input of flip-flop 210 through an inverter 212 while the master clock (MC) pulses are applied to the clock input (C) of both flip-flops. The Q output of flip-flop 210 and the Q output of flip-flop 211 are, in turn, coupled to the inputs of NAND 213, producing a negative-going output pulse at a rate determined by the UJT oscillator pulses applied to the J input of Master flip-flop 210. Moreover, because the Master-Slave flip-flop arrangement is triggered by the negative edge of the Master Clock (MC) pulses, the output pulse generated by NAND 213 has a width equal to that of a master clock (MC) pulse period. This pulse is then applied to NAND 214 which together with NAND 215 comprises a flip-flop. The output of NAND 214 is, in turn, switched high (L) by the pulse. When the SS2 control signal is applied to NAND 216 along with the pulse from NAND 214 and the CONTINUE SKEW signal, all the inputs to NAND 216 are high (1) so that a negative pulse is generated at its output. The pulse is then coupled through inverter 217 to apply a positive DECREMENT pulse to the maximum and minimum skew circuits (FIGS. 9 and 11, respectively).

In the maximum skew circuit, the DECREMENT pulse is applied together with the NEG MAX and POS MAX signals to a pair of NANDS, 218 and 219, respectively. These gates are correspondingly coupled to the UP and DOWN inputs of register counter 156*a*. Thus, if the maximum stored value is negative, the register counter will count in the up direction toward a more negative maximum, while if the stored value is positive, it will count down toward zero. Similarly, the DECREMENT pulse is applied to NANDs 220 and 221 in the minimum skew circuit, and the POS MIN and NEG MIN signals are also applied to NANDs 220 and 221, respectively. Thus, when the minimum stored value is positive, the decrement signal is applied to the UP input of register counter 177*a* to count it up, or away from zero. If, however, the minimum is negative, the pulse will be coupled from NAND 221 to the DOWN input of counter 177*a*, counting it toward zero. Consequently, the register counters 156 and 177 must be periodically refreshed to obtain a true indication of the maximum and minimum skews in the tape transport system.

When Skew State 2 subsequently ends, the output pulse at NAND 216 drops, and the flip-flop comprising NANDs 222 and 223 is reset to apply a high (1) signal at one input to NAND 224. Subsequently, when the SS0 control signal is generated by the skew control center, a reset pulse is developed at the output of NAND 224 and applied to the flip-flop comprising NORs 214 and 215 so that it will be ready to generate the next DECREMENT pulse.

Referring now to FIG. 4*b*, it may be seen that the SKB flip-flop 104 is reset by the first negative-edge of a clock pulse (MC) occurring after the SS2 pulse is coupled through NAND 225 to its K input. Likewise, the SKA flip-flop 201 is reset by a MC pulse if the skew test has not ended. That is, a SKEW STOP CMD is generated (FIG. 5*b*) if the byte clock timer output coupled to NAND 226 indicates that one million bytes have been tested while the skew test has been enabled. The resultant signal developed at the output of NAND 226 is then coupled through NAND 227 to develop the SKEW STOP CMD signal. A SKEW STOP CMD signal may be further obtained by coupling the SKEW STOP CMD through inverter 228. These signals are also developed if the operator applies the external STOP CMD signal through inverter 229 to NAND 227. When the skew test has not been completed, the SKEW STOP CMD applied to NAND 230 along with the SS2 control signal is high (1). The resultant signal coupled to its K input through NAND 231 conditions the SKA flip-flop 201 to reset with the negative-going edge of the next MC pulse.

If, on the other hand, the low-true SKEW STOP CMP pulse is generated because the one million byte skew test is completed, the SKA flip-flop 201 is not reset, and the decoder 100 provides the SS3 control signal. During Skew State 3, the maximum, minimum and average displays are enabled to read-out the skew test results. Subsequently, when the operator applies the external SKEW TEST CLEAR signal to NAND 232 during Skew State 3, the resultant signal is coupled through NAND 231 to reset the SKA flip-flop 201. Accordingly, the decoder 100 generates the SS0 control signal indicating that the circuits are in Skew State $\phi$, ready to begin a new skew test.

As previously mentioned, two error conditions, bit dropout and bit overrun, may be detected so that the skew test may be aborted. Bit dropout is detected when, during the Skew State 1, the character gate pulse falls before the character is complete (i.e., both the reference and test bits are received). Thus, when the CHAR COMP is high (FIG. 4*e*), indicating that both bits have not yet been detected, and the CHAR GATE END signal is developed (FIG. 4*f*), NAND 233 will develop an output pulse. This signal is, in turn, coupled through NAND 234 to set the SKC flip-flop 235. Accordingly, the MC clock pulse applied to its clock input C triggers flip-flop 235 producing an SKC output signal at its Q output. The same three signals are simultaneously applied through NAND 236 and NAND 225 to the K input of SKA flip-flop 104, resetting it when the MC clock pulse falls. Thus, decoder 100 generates the SS4 control signal corresponding to a "decimal 4." The inverted SS4 (i.e., SS4) signal is then applied to the flip-flop (FIG. 5*d*) comprising NANDs 237 and 238, producing a BIT DROPOUT signal which is, in turn, coupled to an indicator (not shown) for warning the operator that bit dropout has been detected. If the SKEW TEST ON signal is then disabled, the resultant signal developed by NAND 239 is inverted by inverter 240 and applied to the flip-flop, resetting it.

The SS4 control signal is then concurrently applied to NAND 241 (FIG. 4*c*) and NAND 242 (FIG. 4*c*). The signal resulting from at NAND 241 is then applied to the K input of SKC flip-flop 235 so that it is reset by the negative edge of the next MC pulse applied to its C input. The SKA flip-flop 201, on the other hand, may be set to generate the SKA pulse coincident with the trailing edge of the same MC pulse if the operator has ended the skew test by applying the SKEW STOP CMD (FIG. 5*b*) to NAND 242. The decoder 100 will then generate the SS3 control signal and the partial results are displayed. Since the complete one million byte skew test has not been completed, however, the average skew displayed should be disregarded.

Bit Overrun is detected by the lead-lag decision circuitry (FIG. 6). There, the RTI output of NAND 108 is connected to the J input of a JK flip-flop 243 having its K input coupled directly to ground. The REFERENCE IN input to NOR 105 is also coupled to the clock input (C). Thus, JK flip-flop 243 is conditioned to provide on output pulse concurrently with the negative edge of the next clock pulse by the RTI signal applied to its J input when the reference bit is detected. Accordingly, if a second reference bit is detected before the CHAR GATE pulse falls, a negative-going BOTR pulse is developed at the Q output of flip-flop 243. After Skew State 1 ends, a RESET signal is applied to the CLEAR gate of flip-flop 243, resetting it for the next skew test.

Similarly, a JK flip-flop 244 likewise has its J input coupled to the TTI output of NAND 111, its K input grounded and its clock input C coupled to the TEST IN input of NAND 111. Thus, if two or more test bits are found during one CHAR GATE interval, a BOTT signal is generated at the Q output of flip-flop 244.

Both the BOTR and the BOTT outputs are coupled to the corresponding inputs of NAND 245 (FIG. 5*c*). Thus, if bit overrun is detected in either of the reference or test channels, the resultant pulse is coupled through inverter 246 and NAND 247 to provide a SENSE BIT OVERRUN signal that is indicative thereof. NAND 247 may have additional inputs to provide for expansion to a total of nine channels. The SENSE BIT OVERRUN signal is also coupled through inverter 248 to "set" a flip-flop comprising NANDs 249 and 250. The signal thereby resulting at the output of NAND 249 is then coupled to an indicator (not shown), warning the operator that bit overrun has occurred. The flip-flop is subsequently reset when the master reset (MR) signal is applied to NAND 251 or the SKEW TEST ON signal applied to its other input goes low (0). In either event, the resultant signal is applied through inverter 252 to reset NAND 250.

Thus, if bit overrun is detected during Skew State 1, the SS1 and SENSE BIT OVERRUN signals are applied to NAND 253 (FIG. 4*c*) together with the CHAR GATE signal. The resultant pulse is applied to the J input of the SKC flip-flop 235 through an inverter 234. Consequently, the next MC clock pulse will trigger the SKC flip-flop 235. Because the error condition is detected in Skew State 1, the SKB signal is already applied to decoder 100 so that the SKC signal switches it to "decimal 6," or Skew State 5. Subsequently, the SS5 control signal is applied to NANDs 254 and 255 (FIG. 4*b* and 4*c*) together with the CHAR GATE END signal to reset the SKB and SKC flip-flops, 104 and 235, respectively.

Accordingly, there has been shown a skew measurement circuit which is useful in determining the maximum, minimum and average skew of a tape transport over a one million byte skew test, providing a digital read-out of the resultant data and thereby eliminating any operator interpretation of data. Further, the average skew is obtained by simple logic addition and subtraction so that complex calculating hardware is not required for computation of the average. The circuit also includes means for periodically decrementing the maximum and minimum stored skew values at a predetermined rate to insure that those values accurately reflect the true skew characteristics of the tape transport system.

While a particular embodiment of the present invention has been shown and described, it will be obvious to those skilled in the art that various changes and modifications may be made without departing from the invention in its broader aspects. Accordingly, the aim in the appended claims is to cover all such changes and modifications as may fall within the true spirit and scope of the invention.

I claim:

1. A circuit for monitoring the arrival of corresponding reference and test channel bits comprising an informational character (byte) at a tape head to determine the skew characteristics of a tape transport system; said skew measurement circuit comprising in combination:

instantaneous counting means for measuring the instantaneous skew between the detected arrival of said reference bit at said tape head and the detected arrival of said corresponding test bit at said tape head;

min/max comparison and storage means for detecting and storing the minimum and maximum values of said instantaneous skew, said min/max means subsequently comparing each said instantaneous skew with said stored values and replacing the appropriate one whenever new said maximums and minimum are detected; and decrementing means for decreasing said maximum stored value and increasing said minimum stored value at a predetermined rate so that said maximum and minimum stored values must be periodically refreshed to insure their validity as characteristic of said tape transport system.

2. A skew measurement circuit in accordance with claim 1 including lead-lag decision means having reference channel and test channel inputs for determining which one of said reference and test bits in each of said characters is initially detected by said tape head, said lead-lag means developing an instantaneous skew sign signal indicating when said reference bit leads said test bit and when said reference bit lags said test bit.

3. A skew measurement circuit in accordance with claim 2 wherein said lead-lag decision means generates a lead signal during the time interval between the arrival of said reference bit at said tape head and the subsequent arrival of said corresponding test bit, said lead-lag means generating a lag signal during the time interval between the detection of said bits if said reference bit is detected subsequent to the arrival of said test bit, said instantaneous counting means being enabled to count only during the time interval when said lead and lag signals are applied thereto.

4. A skew measurement circuit in accordance with claim 3 including clock means for developing a clock pulse train having a predetermined frequency, said clock pulse train being applied to said instantaneous counting means for initiating a count therein coincident with each said clock during intervals when the appropriate one of said lead and lag signals is applied to said instantaneous counting means.

5. A skew measurement circuit in accordance with claim 2 including averaging means responsive to said instantaneous counting means for determining the average value of said instantaneous skew during said skew test, said averaging means totaling said instantaneous skew during a skew test comprising a plurality of said characters and developing an average skew sign signal indicating whether the total of said time intervals during which said reference bit leads said test bit exceeds the total of said time intervals during which said reference bit lags said test bit.

6. A skew measurement circuit in accordance with claim 5 wherein said averaging means includes counting means for adding said instantaneous skew to said total instantaneous skew if said instantaneous and average skew signs are the same, said counting means counting down to subtract said instantaneous skew from said total skew if said instantaneous and average skew sign are opposite.

7. A skew measurement circuit in accordance with claim 6 wherein said skew test comprises $10^n$ characters and *n* in a positive integer, said averaging means totaling said instantaneous skew during said skew test to determine the average value of said instantaneous skew when decimal point associated with said total instantaneous skew is moved *n* places to the left.

8. A skew measurement circuit in accordance with claim 7 wherein said skew test comprises one million characters.

9. A skew measurement circuit in accordance with claim 2 wherein said lead-lag decision means includes means for arbitrarily designating said instantaneous skew sign to be positive when said reference bit leads said test bit and to be negative when said reference bit lags said test bit.

10. A skew measurement circuit in accordance with claim 9 wherein said min/max comparision and storage means comprise minimum and maximum storage register means for storing the minimum and maximum values of said instantaneous skew, said min/max means further including minimum and maximum comparator means for generating a load max signal and a load min signal, said load max signal being coupled to said maximum storage register means to replace said maximum stored value in said maximum register means with said instantaneous skew whenever said instantaneous skew exceeds said maximum stored value, said load min signal being coupled to said minimum storage register means to replace said minimum stored value when said instantaneous skew is less than said minimum stored value.

11. A skew measurement circuit in accordance with claim 10 wherein said maximum comparator means include magnitude comparator means and sign comparator means, said sign comparator means comparing the sign of said instantaneous skew with the sign of said maximum stored value and generating said load max signal if said instantaneous skew sign is positive and the sign of said maximum stored value is negative, said magnitude comparator means comparing the absolute values of said instantaneous skew and said maximum stored value to determine if the absolute value of said instantaneous skew is greater than said maximum stored value, said sign comparator means also generating said load max when both of said signs are positive and the magnitude of said instantaneous skew is greater than that of said maximum stored value and when both of said signs are negative and the magnitude of said instantaneous skew is less than that of said maximum stored value.

12. A skew measurement circuit in accordance with claim 10 wherein said minimum comparator means include magnitude comparator means and sign comparator means, said sign comparator means comparing said instantaneous skew sign with the sign of said stored minimum value and generating load min signal if said instantaneous skew sign is negative and the sign of said minimum stored value is positive, said magnitude comparator means comparing the absolute values of said instantaneous skew and said minimum stored value to determine if the absolute value of said instantaneous skew is less than said minimum stored value, said sign comparator means also generating said load min signal when both of said signs are negative and the magnitude of said instantaneous skew is greater than that of said minimum stored value and when both of said signs are positive and the magnitude of said instantaneous skew is less than that of said minimum stored value.

13. A skew measurement circuit in accordance with claim 10 wherein said load max and load min signals are simultaneously generated to load the initial value of said instantaneous skew into said maximum and minimum storage registers.

14. A skew measurement circuit in accordance with claim 10 wherein both said minimum and maximum storage register means comprise synchronous up/down decade counters coupled to said instantaneous counting means, said instantaneous skew being loaded into said maximum up/down counters whenever said load max signal is applied thereto and into said minimum up/down counters whenever said load min signal is generated.

15. A skew measurement circuit in accordance with claim 14 wherein said decrementing means generates a decrement signal occurring at a predetermined frequency, each said decrement signal initiating a corresponding down count by said maximum up/down decade counters if said maximum stored value is positive and an up count if said maximum stored value is negative, said decrement signal initiating down count by said minimum up/down decade counters if said minimum stored value is negative and an up count if positive.

16. A skew measurement circuit in accordance with claim 15 wherein said decrementing means includes a unijunction transistor relaxation oscillator for determining the frequency at which said decrement signals are generated, said relaxation oscillator being adjustable to vary said frequency.

17. A skew measurement circuit in accordance with claim 1 including control means for generating internal control signals so that said instantaneous counting means, said min/max comparision and storage means and said decrementing means are sequentially enabled, said control means including reference channel and test channel inputs.

18. A skew measurement circuit in accordance with claim 17 including character gate means having reference channel and test channel inputs for generating a character gate signal coincidentally with the detection of the first one of said bits, said character gate signal continuing for a predetermined time interval during which the other of said bits can also be detected, said character gate signal being coupled to an input of said control means.

19. A skew measurement circuit in accordance with claim 18 wherein said control means generate a first control signal during the interval that said character gate signal is generated, said first control signal being coupled to said instantaneous counting means enabling it to measure said instantaneous skew, said first control signal further being applied to said min/max comparison and storage means enabling comparison of said instantaneous skew with said minimum stored value and said maximum stored value after said instantaneous skew has been determined.

20. A skew measurement circuit in accordance with claim 18 wherein said control means generates a first error signal whenever at least two of said reference bits are detected during said character gate interval, said error signal also being generated if at least two of said test bits are detected during said character gate interval, said error signal being effective to reset said instantaneous counting means.

21. A skew measurement circuit in accordance with claim 18 wherein said control means generates a second error signal if said character gate interval ends before said reference bit is detected, said second error signal also being generated if said character gate interval ends before said test bit is detected.

22. A skew measurement circuit in accordance with claim 18 wherein said control means generates a second control signal when both of said bits have been detected and said character gate signal has ended, said second control signal enabling said decrementing means.

23. A skew measurement circuit in accordance with claim 18 wherein display means are included for providing a visual read-out of the results of said skew test, said display means being driven by and coupled to said min/max comparision and storage means.

24. A skew measurement circuit in accordance with claim 23 wherein said display means further comprises means for displaying said maximum stored value and said minimum stored value upon the completion of said skew test.

25. A skew measurement circuit in accordance with claim 23 including byte counter means having an input coupled to said character gate signal for generating a skew stop signal coupled to said control means and wherein said control means generates a third control signal when said skew test is complete, said third control signal enabling said display means to display the results of said skew test.

26. A skew measurement circuit in accordance with claim 25 including byte counting means for counting said character gate signals, said byte counting means enabling said control means to continue said skew test as long as the number of said character gate signals counted by said byte counting means indicates that said skew has not been completed.

* * * * *